US012663954B2

(12) United States Patent
Lee et al.

(10) Patent No.: US 12,663,954 B2
(45) Date of Patent: Jun. 23, 2026

(54) SIZE OF A CONTENT IMAGE OF AN EXTERNAL DISPLAY APPARATUS

(71) Applicant: SAMSUNG ELECTRONICS CO., LTD., Suwon-si (KR)

(72) Inventors: Dongho Lee, Suwon-si (KR); Nakwon Choi, Suwon-si (KR); Bumho Chun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/798,178

(22) Filed: Aug. 8, 2024

(65) Prior Publication Data

US 2025/0094112 A1     Mar. 20, 2025

Related U.S. Application Data

(63) Continuation of application No. PCT/KR2024/010289, filed on Jul. 17, 2024.

(30) Foreign Application Priority Data

Sep. 20, 2023     (KR) ........................ 10-2023-0125309

(51) Int. Cl.
| | |
|---|---|
| *G06F 3/14* | (2006.01) |
| *G06F 1/16* | (2006.01) |
| *G06F 3/04845* | (2022.01) |

(52) U.S. Cl.
CPC .......... *G06F 3/1446* (2013.01); *G06F 1/1677* (2013.01); *G06F 3/04845* (2013.01); *G06F 3/1431* (2013.01)

(58) Field of Classification Search
CPC .. G06F 1/1677; G06F 1/1681; G06F 3/04845; G06F 3/1431; G06F 3/1446
See application file for complete search history.

(56) References Cited

U.S. PATENT DOCUMENTS

| | | | |
|---|---|---|---|
| 8,866,840 | B2 | 10/2014 | Dahl et al. |
| 9,633,413 | B2 | 4/2017 | Kim et al. |

(Continued)

FOREIGN PATENT DOCUMENTS

| | | |
|---|---|---|
| JP | 2016-35756 A | 3/2016 |
| KR | 10-2009-0057567 A | 6/2009 |

(Continued)

OTHER PUBLICATIONS

International Search Report and Written Opinion (PCT/ISA/210 and PCT/ISA/237) dated Oct. 22, 2024, issued by International Searching Authority for International Application No. PCT/KR2024/010289.

*Primary Examiner* — Yaron Cohen
(74) *Attorney, Agent, or Firm* — Sughrue Mion, PLLC

(57) ABSTRACT

A display apparatus and a method for controlling thereof are provided. The display apparatus includes: at least one processor configured to: obtain a content image, obtain, based on an external display apparatus being connected to a display apparatus through a hinge device, a first content image and a remaining portion of the content image, wherein the first content image is identified based on a resolution of the display apparatus, control the display to display the first content image, provide the second content image to the external display apparatus, and adjust, based on an angle between the display apparatus and the external display apparatus changing while displaying the first content image, a size of the second content image provided to the external display apparatus according to the angle while maintaining a size of the first content image.

18 Claims, 12 Drawing Sheets

(56)                    References Cited

U.S. PATENT DOCUMENTS

| | | | |
|---|---|---|---|
| 10,209,878 | B2 | 2/2019 | Sang et al. |
| 10,488,947 | B2 | 11/2019 | Kwon et al. |
| 10,860,274 | B2 | 12/2020 | Son et al. |
| 11,150,742 | B2 | 10/2021 | Kwon et al. |
| 11,288,029 | B2 | 3/2022 | Joo et al. |
| 11,940,847 | B2 | 3/2024 | Yoon et al. |
| 2015/0348453 | A1 | 12/2015 | Jin et al. |
| 2018/0329514 | A1 | 11/2018 | Kwon et al. |
| 2019/0004764 | A1 | 1/2019 | Son et al. |
| 2020/0050285 | A1 | 2/2020 | Kwon et al. |
| 2020/0364021 | A1* | 11/2020 | Park ...................... H04N 23/51 |
| 2021/0124543 | A1 | 4/2021 | Joo et al. |
| 2022/0019397 | A1 | 1/2022 | Park |
| 2022/0035418 | A1* | 2/2022 | Holung ................. G06F 1/1618 |

FOREIGN PATENT DOCUMENTS

| | | | |
|---|---|---|---|
| KR | 10-2015-0092439 | A | 8/2015 |
| KR | 10-2015-0139214 | A | 12/2015 |
| KR | 10-2019-0001822 | A | 1/2019 |
| KR | 10-2020-0071266 | A | 6/2020 |
| KR | 10-2020-0132362 | A | 11/2020 |
| KR | 10-2021-0050800 | A | 5/2021 |
| KR | 10-2358110 | B1 | 2/2022 |
| KR | 10-2359544 | B1 | 2/2022 |
| KR | 10-2022-0061752 | A | 5/2022 |

* cited by examiner

SIZE OF A CONTENT IMAGE OF AN EXTERNAL DISPLAY APPARATUS

CROSS-REFERENCE TO RELATED APPLICATIONS

This application is a continuation of International Application No. PCT/KR2024/010289 designating the United States, filed on Jul. 17, 2024, in the Korean Intellectual Property Receiving Office and claiming priority to Korean Patent Application No. 10-2023-0125309, filed on Sep. 20, 2023, in the Korean Intellectual Property Office, the disclosures of each of which are incorporated by reference herein in their entireties.

BACKGROUND

Field

The disclosure relates to a display apparatus and a method for controlling thereof. Specifically, the disclosure relates to a display apparatus that adjusts a size of a content image of an external display apparatus which is connected with the display apparatus through a hinge device and a method for controlling thereof.

Description of Related Art

Display systems having various forms are being developed and supplied. Specifically, with developments in display technology resulting in large scale and high-resolution display systems, sizes of screens of the display apparatuses have become more varied. Accordingly, use of large screen display apparatuses are increasing in real-life. Specifically, use of modular display apparatuses that combine a plurality of display apparatuses and provide an expanded display screen is increasing. For example, large screen display apparatuses are being installed in places with high visibility, such as subway stations, bus stops, and the like, and digital signage boards that display information are examples of the above.

In modular display apparatuses, the plurality of display apparatuses may be coupled through a hinge device so as to be rotatable or foldable. At this time, if the display apparatus is folded according to use environment or purpose, a problem of visibility of a user being obstructed with respect to a content image being displayed in the display apparatus which is rotated relative to the hinge device may occur. The above may also lead to a problem of decreasing a sense of immersion (or attentional engagement) of the user of the content image.

SUMMARY

Provided are a display apparatus and a method for controlling thereof. Additional aspects will be set forth in part in the description which follows and, in part, will be apparent from the description, or may be learned by practice of the presented embodiments.

In accordance with an aspect of the disclosure, a display apparatus includes: a display; a first hinge device; and at least one processor configured to: obtain a content image, obtain, based on a first external display apparatus being connected to the display apparatus through the first hinge device, a first content image corresponding to a portion of the content image and a second content image corresponding to a remaining portion of the content image, wherein the first content image is identified based on a resolution of the display apparatus, control the display to display the first content image, provide the second content image to the first external display apparatus, and adjust, based on an angle between the display apparatus and the first external display apparatus changing while displaying the first content image, a size of the second content image provided to the first external display apparatus according to the angle while maintaining a size of the first content image.

The at least one processor may be further configured to identify a direction corresponding to a position of the first external display apparatus, identify an area of the content image positioned at an opposite direction from the direction, and obtain the first content image by cropping the area to a size corresponding to the resolution of the display apparatus.

The at least one processor may be further configured to inversely adjust the size of the second content image according to a size of the angle.

The first hinge device may be provided at a first side of the display apparatus, the display apparatus may further include a second hinge device provided at a second side of the display apparatus, and the at least one processor may be further configured to obtain the first content image by cropping the content image based on a number of external display apparatuses connected to the display apparatus and the resolution of the display apparatus.

The at least one processor may be further configured to adjust a width of the second content image based on:

$$\text{width of second content image} = \frac{(X1 - X2)}{n} \times \left(1 + \frac{\alpha}{\min}\right),$$

wherein X1 is a horizontal ratio of the content image, X2 is a horizontal ratio of the resolution of the display apparatus, n is the number of external display apparatuses connected with the display apparatus, $\alpha$ is the angle between the display apparatus the first external display apparatus, and min is a minimum angle that the first external display apparatus and the display apparatus can form.

The at least one processor may be further configured to identify, based on the angle changing while displaying the first content image, a ratio of the content image, and maintain, based on the ratio being identified as a preset ratio, the size of the second content image.

The display apparatus may further include a wheel configured to rotate as the first external display apparatus rotates, and the at least one processor may be further configured to identify the angle based on a number of wheel rotations.

The at least one processor may be further configured to: sense a resistance value of a resistor provided in the first hinge device, and identify the angle based on the resistance value.

The at least one processor may be further configured to: sense, based on the first external display apparatus being connected to the display apparatus through the first hinge device, the angle between the display apparatus and the first external display apparatus, and adjust, based on the angle not being a preset angle, the size of the second content image provided to the first external display apparatus based on the angle.

In accordance with an aspect of the disclosure, a method for controlling a display apparatus includes: obtaining a content image; sensing a connection of a first external display apparatus to the display apparatus through a first hinge device; obtaining a first content image corresponding to a portion of the content image and a second content image corresponding to a remaining portion of the content image, wherein the first content image is identified based on a resolution of the display apparatus; displaying the first content image through a display of the display apparatus; providing the second content image to the first external display apparatus to control the second content image to be displayed on the first external display apparatus; sensing rotation of the first external display apparatus relative to the display apparatus while displaying the first content image; and adjusting a size of the second content image provided to the first external display apparatus based on an angle at which the first external display apparatus is moved while maintaining a size of the first content image.

The obtaining may include: identifying a direction corresponding to a position of the first external display apparatus, identifying an area of the content image positioned at an opposite direction from the direction, and obtaining the first content image by cropping the area to a size corresponding to the resolution of the display apparatus.

The adjusting may include inversely adjusting the size of the second content image according to a size of the angle.

The method may further include sensing connection of a second external display apparatus to the display apparatus through a second hinge device. The first hinge device may be provided at a first side of the display apparatus and the second hinge device may be provided at a second side of the display apparatus. The obtaining may include obtaining the first content image by cropping the content image based on a number of external display apparatuses connected to the display apparatus and the resolution of the display apparatus.

The adjusting may include adjusting a width of the second content image based on:

$$\text{width of second content image} = \frac{(X1 - X2)}{n} \times \left(1 + \frac{\alpha}{\min}\right),$$

wherein X1 is a horizontal ratio of the content image, X2 is a horizontal ratio of the resolution of the display apparatus, n is the number of external display apparatuses connected with the display apparatus, α is the angle between the display apparatus and the first external display apparatus, and min is a minimum angle that the first external display apparatus and the display apparatus can form.

In accordance with an aspect of the disclosure, a non-transitory computer-readable medium storing computer instructions for a display apparatus to perform an operation when executed by a processor of the display apparatus, the operation including: obtaining a content image; sensing a connection of a first external display apparatus to the display apparatus through a first hinge device; obtaining a first content image corresponding to a portion of the content image and a second content image corresponding to a remaining portion of the content image, wherein the first content image is identified based on a resolution of the display apparatus; displaying the first content image through a display of the display apparatus; providing the second content image to the first external display apparatus to control the second content image to be displayed on the first external display apparatus; sensing rotation of the first external display apparatus relative to the display apparatus while displaying the first content image; and adjusting a size of the second content image provided to the first external display apparatus based on an angle at which the first external display apparatus is moved while maintaining a size of the first content image.

In accordance with an aspect of the disclosure, a display controller includes: an interface configured to control a display apparatus and a first external display apparatus; at least one processor configured to: obtain a content image, obtain, based on the display apparatus being connected to the first external display apparatus through a first hinge device, a first content image corresponding to a portion of the content image and a second content image corresponding to a remaining portion of the content image, wherein the first content image is identified based on a resolution of the display apparatus, provide the first content image to the display apparatus, provide the second content image to the first external display apparatus, and adjust, based on an angle between the display apparatus and the first external display apparatus changing while displaying the first content image, a size of the second content image provided to the first external display apparatus according to the angle while maintaining a size of the first content image.

The at least one processor may be further configured to identify a direction corresponding to a position of the first external display apparatus, identify an area of the content image positioned at an opposite direction from the direction, and obtain the first content image by cropping the area to a size corresponding to the resolution of the display apparatus.

The at least one processor may be further configured to inversely adjust the size of the second content image according to a size of the angle.

The first hinge device may be provided at a first side of the display apparatus, the display apparatus may further include a second hinge device provided at a second side of the display apparatus, and the at least one processor may be further configured to obtain the first content image by cropping the content image based on a number of external display apparatuses connected to the display apparatus and the resolution of the display apparatus.

The at least one processor may be further configured to identify, based on the angle changing while displaying the first content image, a ratio of the content image, and maintain, based on the ratio being identified as a preset ratio, the size of the second content image.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
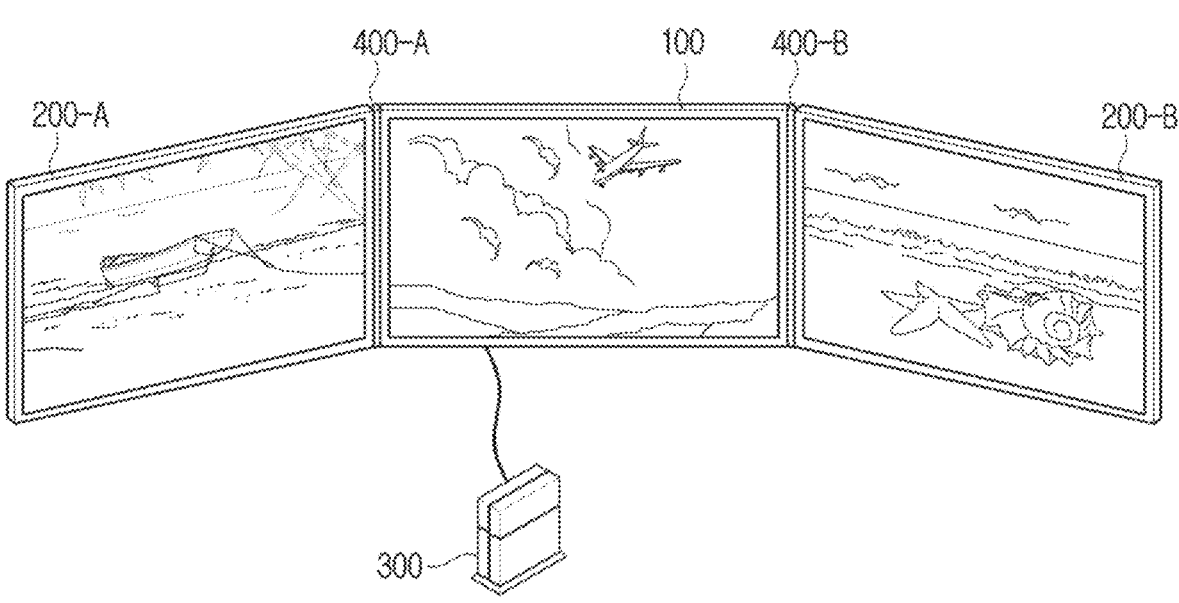
FIG. 1 is an example diagram illustrating a display apparatus according to an embodiment.

Embodiments are described below with reference to the accompanying drawings. Embodiments described herein are examples, and thus, the present disclosure is not limited thereto, and may be realized in various other forms. Each embodiment provided in the following description is not excluded from being associated with one or more features of another example or another embodiment also provided herein or not provided herein but consistent with the present disclosure.

Terms used in describing an embodiment of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the relevant description. Accordingly, the terms used herein are not to be understood simply as its designation but based on the meaning of the term and the overall context of the disclosure.

In the disclosure, expressions such as "have," "may have," "include," and "may include" are used to designate a presence of a corresponding characteristic (e.g., elements such as numerical value, function, operation, or component), and not to preclude a presence or a possibility of additional characteristics.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Expressions such as "1st", "2nd", "first" or "second" used in the disclosure may limit various elements regardless of order and/or importance, and may be used merely to distinguish one element from another element and not limit the relevant element.

When a certain element (e.g., a first element) is indicated as being "(operatively or communicatively) coupled with/to" or "connected to" another element (e.g., a second element), it may be understood as the certain element being directly coupled with/to the another element or as being coupled through other element (e.g., a third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in the disclosure perform at least one function or operation, and may be implemented with a hardware or software, or implemented with a combination of hardware and software. In addition, a plurality of "modules" or a plurality of "parts," except for a "module" or a "part" which needs to be implemented to a specific hardware, may be integrated in at least one module and implemented as at least one processor.

In the disclosure, the term "user" may refer to a person using a display apparatus or an apparatus (e.g., an artificial intelligence display apparatus) using the display apparatus.

Embodiments are described in greater detail below with reference to the accompanied drawings.

FIG. 1 is an example diagram illustrating a display apparatus 100 according to an embodiment.

The display apparatus 100 according to an embodiment may be connected with at least one external display apparatus 200-A and 200-B (hereinafter, 200). The display apparatus 100 may be connected with at least one external display apparatus 200 through an electrical and/or physical connection.

For example, the display apparatus 100 may be physically coupled with the external display apparatus 200 through a hinge device 400-A and 400-B (hereinafter, 400), and form a folding structure. Here, the folding structure may be a structure which uses one side surface of the display apparatus 100 at which the display apparatus 100 and the external display apparatus 200 are connected as a shaft to which at least one from among the display apparatus 100 and the external display apparatus 200 are connected so as to be rotated. Specifically, with the folding structure, an angle formed by the display apparatus 100 and the external display apparatus 200 may be modified. Hereinafter, the external display apparatus 200 being folded may be the external display apparatus 200 being rotated so the angle formed by the display apparatus 100 and the external display apparatus 200 is changed. For example, the angle may be increased or reduced.

For example, the display apparatus 100 may be electrically connected with the external display apparatus 200 through the hinge device, and may transmit and receive electrical signals. Here, the electrical signals may include various data such as content image data, and the like. In addition, the display device 100 may supply power to the external display apparatus 200 through the hinge device 400.

Specifically, the display apparatus 100 may be connected with the at least one external display apparatus 200 through the hinge device 400. Thereby, the display apparatus 100 and the at least one external display apparatus 200 may rotate about the hinge device 400 toward a front direction or a rear direction. Hereinafter, for convenience of description, it will be described the at least one external display apparatus 200 is rotated about the hinge device 400. That is, it will be described that the display apparatus 100 is fixed, and the at least one external display apparatus 200 connected with the display apparatus 100 is rotated.

The display apparatus 100 may be connected with a source device 300. Further, the display apparatus 100 may obtain a content source (e.g., a content image, etc.) from the source device 300. The source device 300 may be connected with the display apparatus 100 and provide data stored in the source device 300 or provided from an external source device to the display apparatus 100.

The source device 300 may include at least one port capable to which various cables such as a power cable, an optical cable, a High-Definition Multimedia Interface (HDMI) cable, a radio frequency (RF) cable, a local area network (LAN) cable, and the like may be connected. The source device 300 may be connected with the display apparatus 100 through a cable connected to a port, or connected with an external source. Specifically, the source device 300 may be connected with various external sources such as, for example, and without limitation, a personal computer (PC), a set top box, an over-the-top media service (OTT service) server, a video game console, a Blu-ray player, a DVD player, and the like through a cable connected to the at least one port. However, the source device 300 is not limited thereto, and the source device 300 may be implemented as for example a PC, a set top box, an OTT service, a video game console, a Blu-ray player, a digital video disc (DVD) player, and the like that directly provides content to the display apparatus 100.

The source device 300 may be connected with the display apparatus 100. Accordingly, even if an external source is not directly connected to the display apparatus 100 through several connection lines, the display apparatus 100 may receive content of various external sources through the source device 300. The source device 300 may be variously designated such as a one-connect box, a one-connect device, a source integrated device, and the like, but may be referred to as the source device 300.

The display apparatus 100 may be implemented as an apparatus which includes a display function such as, for example, and without limitation, a television (TV), a smart TV, a monitor, and the like. The display apparatus 100 may display a content source (e.g., a content image, etc.) received through the source device 300 through a display of the display apparatus 100. At this time, the display apparatus 100 may provide a portion of the content source to the external display apparatus 200 connected with the display apparatus 100 based on a size of the content source received from the source device 300.

In an example, the display apparatus 100 may provide a portion of the content image to the external display apparatus 200 based on a resolution size of the content image. Specifically, the display apparatus 100 may identify that the resolution size of the content image is not a match with a resolution of the display apparatus 100 and a size of the display, and may provide a remaining portion of the image excluding one portion of the image which can be displayed in the display apparatus 100 from among the content image to the external display apparatus 200 to be displayed in the external display apparatus 200 connected to the display apparatus 100.

To this end, the external display apparatus 200 may also be implemented as an apparatus including a display function such as, for example, and without limitation, a TV, a smart TV, a monitor, and the like.

The external display apparatus 200 may be an independent apparatus which can be used coupled with the display apparatus 100 or separated and used separately. Specifically, the external display apparatus 200 may display a portion of the content image received by the display apparatus 100 as described above or display a same image as the content image received by the display apparatus 100 according to a user input or a setting mode. Alternatively, like the same image or the portion of the content image, a separate image unrelated to the content image received by the display apparatus 100 may be displayed.

Hereinafter, an example is described in which the external display apparatus 200 is displaying the portion of the content image received by the display apparatus 100 from the source device 300.

The display apparatus 100 may be referred to as a main display apparatus 100, and the external display apparatus 200 may be referred to as a sub display apparatus 200 based on the display apparatus 100 receiving the content image from the source device 300 and then, providing to the external display apparatus 200 or processing the obtained content image (specifically, by obtaining a portion of an image of the obtained content image) and providing the same. The main display apparatus 100 and the external display apparatus 200 may be determined according to whether or not it is connected with the source device 300, or may be determined based on a user setting.

While the display apparatus 100 and the external display apparatus 200 are respectively displaying a portion of the same content image, the external display apparatus 200 may move about the hinge device 400 toward one direction by a user (or by a separate control command). For example, referring to FIG. 1, while the display apparatus 100 displays a center portion of the content image (a center image), the external display apparatus 200 connected at a left side of the display apparatus 100 (hereinafter, a left external display apparatus 200) displays a left portion of the content image (hereinafter, a left image), and the external display apparatus 200 connected at a right side of the display apparatus 100 (hereinafter, a right external display apparatus 200) displays a right portion of the content image (hereinafter, a right image), the left external display apparatus 200 may be rotated toward the front direction by the user. That is, the left external display apparatus 200 may be folded.

At this time, as the left external display apparatus 200-A is rotated toward the front direction, the left image of the left external display apparatus 200-A may be distorted. That is, the distorted left image of the left external display apparatus 200-A may be visible to the user positioned at a front of the display apparatus 100. The above obstructs the visibility of the user for the left image, and ultimately decreases a sense of immersion of the user for the whole image (i.e., a whole image which is displayed with the left image, the center image, and the right image).

Accordingly, the display apparatus 100 according to an embodiment may adjust, based on a movement of the external display apparatus 200 connected with the display apparatus 100 being sensed, a size of the content image which is displayed in the external display apparatus 200 according to the movement (or folding) of the external display apparatus 200. Specifically, the display apparatus 100 may increase, based on the external display apparatus 200 being folded, the size of the content image in the external display apparatus 200, and reduce the distortion of the content image which is displayed in the folded external display apparatus 200. Hereinafter, an embodiment associated with the above will be described.

In FIG. 1, although a plurality of external display apparatuses 200 has been shown as coupled to the left side and the right side of the display apparatus 100, embodiments are not limited thereto. For example, the plurality of external display apparatuses 200 may be coupled toward an upper and lower direction of the display apparatus 100. Alternatively, the display apparatus 100 and the at least one external display apparatus 200 may be coupled in various coupled forms according to the content image.

Figure 2:
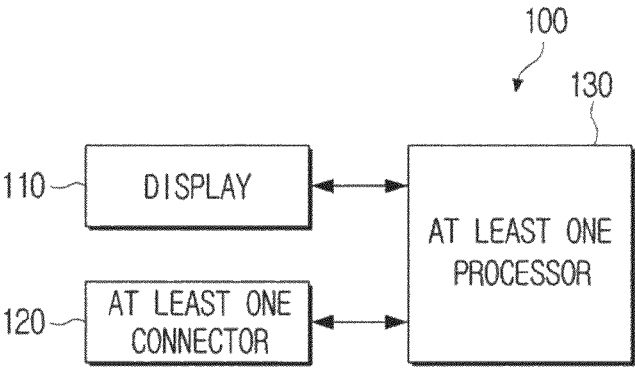
FIG. 2 is a block diagram illustrating schematically a display apparatus according to an embodiment.

FIG. 2 is a block diagram illustrating schematically the display apparatus 100 according to an embodiment.

Referring to FIG. 2, the display apparatus 100 may include a display 110, at least one connector 120 which connects with the hinge device 400, and at least one processor 130. Descriptions of configurations shown in FIG. 2 may be identically applied to the external display apparatus 200 in addition to the display apparatus 100.

The display 110 may display various visual information (e.g., content image) according to control by the at least one processor 130. Here, the content image may include images of various formats such as, for example, and without limitation, texts, still images, moving images, a graphic user interface (GUI), and the like. Specifically, the display 110 may display the content image received from the source device 300.

The display 110 may be implemented as a touch screen together with a touch panel. At this time, the display 110 may operate as an output interface which outputs information between the display apparatus 100 and the user, while simultaneously operating as an input interface between the display apparatus 100 and the user.

The display 110 may be implemented as a display 110 of various forms such as, for example, and without limitation, a liquid crystal display (LCD) panel, a light emitting diode (LED), an organic light emitting diode (OLED), liquid crystal on silicon (LCoS), a digital light processing (DLP), and the like. The display 110 may include supplementary configurations additionally according to an implementation method thereof. For example, the display 110 may be included with a driving circuit which can be implemented in a form such as, for example, and without limitation, an amorphous silicon (a-Si) thin-film-transistor (TFT), a low temperature poly silicon (LTPS) TFT, an organic TFT, and the like, a backlight, and the like, together therewith.

The at least one connector 120 may transfer an electrical signal to the at least one display apparatus 100 through the hinge device 400. To this end, the connector 120 may include a plurality of pogo pins, and the plurality of pogo pins may be formed of a conductive metal. At this time, the display apparatus 100 may be connected with the hinge device 400 through a cable (e.g., an HDMI cable, etc.) connected to the at least one connector 120, and may be electrically connected with the external display apparatus 200 through the hinge device 400.

The display apparatus 100 may also include a plurality of connectors 120. At this time, the plurality of connectors 120 may be formed by being respectively disposed at different side surfaces of the display apparatus 100 from one another, and electrically connect the display apparatus 100 with the respectively different external display apparatuses 200 (and other respectively different hinge devices 400). For example, the connector 120 disposed at a left surface of the display apparatus 100 may be connected with the hinge device 400 which is disposed at a left side of the display apparatus 100, and connect the external display apparatus 200 which is disposed at the left side of the display apparatus 100 with the display apparatus 100 through the hinge device 400. Alternatively, the connector 120 disposed at a right surface of the display apparatus 100 may be connected with the hinge device 400 which is disposed at a right side of the display apparatus 100, and connect the external display apparatus 200 which is disposed at the right side of the display apparatus 100 with the display apparatus 100 through the hinge device 400.

The display apparatus 100 may further include an interface (or connector 120) which connects the display apparatus 100 with the source device 300. At this time, the display apparatus 100 may be electrically connected with the source device 300 through a cable (e.g., HDMI cable, etc.) connected to the interface (or connector 120), and receive various data such as content image from the source device 300. The display apparatus 100 may receive data such as content image from the source device 300 through a communication interface.

The display apparatus 100 may further include a housing. Here, the housing may be a configuration that supports the display apparatus 100, and may include a bezel which is formed around the display 110. At this time, the at least one connector 120 described above may be formed at a side surface of the housing.

The at least one processor 130 may include one or more from among a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 130 may control one or a random combination from among other elements of the display apparatus 100, and perform an operation associated with communication or data processing. The at least one processor 130 may execute one or more programs or instructions stored in a memory. For example, the at least one processor 130 may perform, by executing the one or more instructions stored in the memory, a method according to an embodiment.

When a method according to an embodiment includes a plurality of operations, the plurality of operations may be performed by one processor, or performed by a plurality of processors. For example, when a first operation, a second operation, and a third operation are performed by a method according an embodiment, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The at least one processor 130 may be implemented as a single core processor that includes one core, or as one or more multicore processors that includes a plurality of cores (e.g., a homogeneous multicore or a heterogeneous multicore). If the at least one processor 130 is implemented as a multicore processor, each of the plurality of cores included in the multicore processor may include a memory inside the at least one processor 130 such as a cache memory and an on-chip memory, and a common cache shared by the plurality of cores may be included in the multicore processor. In addition, each of the plurality of cores (or a portion from among the plurality of cores) included in the multicore processor may independently read and perform a program command for implementing a method according to an embodiment, or read and perform a program command for implementing a method according to an embodiment due to a whole (or a portion) of the plurality of cores being interconnected.

When a method according to an embodiment includes a plurality of operations, the plurality of operations may be performed by one core from among the plurality of cores or performed by the plurality of cores included in the multicore processor. For example, when a first operation, a second operation, and a third operation are performed by a method according to an embodiment, the first operation, the second operation, and the third operation may all be performed by a first core included in the multicore processor, or the first operation and the second operation may be performed by the first core included in the multicore processor and the third operation may be performed by a second core included in the multicore processor.

In an embodiment, the at least one processor 130 may refer to a system on chip (SoC), a single core processor, or a multicore processor in which the at least one processor and other electronic components are integrated or a core included in the single core processor or the multicore processor, and the core herein may be implemented as the CPU, the GPU, the APU, the MIC, the DSP, the NPU, the hardware accelerator, the machine learning accelerator, or the like, but is not limited thereto. Hereinafter, the at least one processor will be described referred to as the processor.

Figure 3:
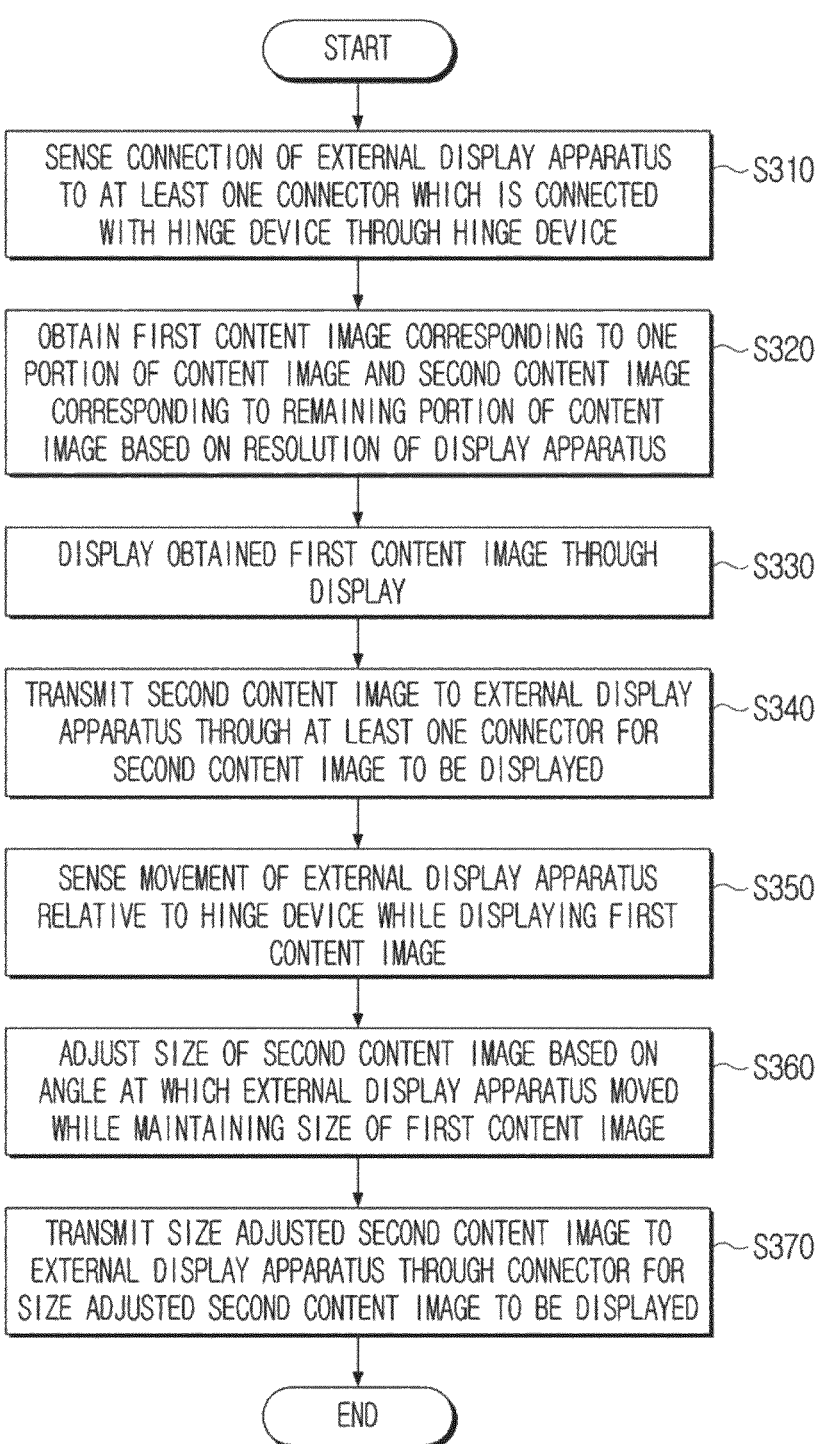
FIG. 3 is a flowchart illustrating schematically a method for controlling a display apparatus according to an embodiment.
Figure 4:
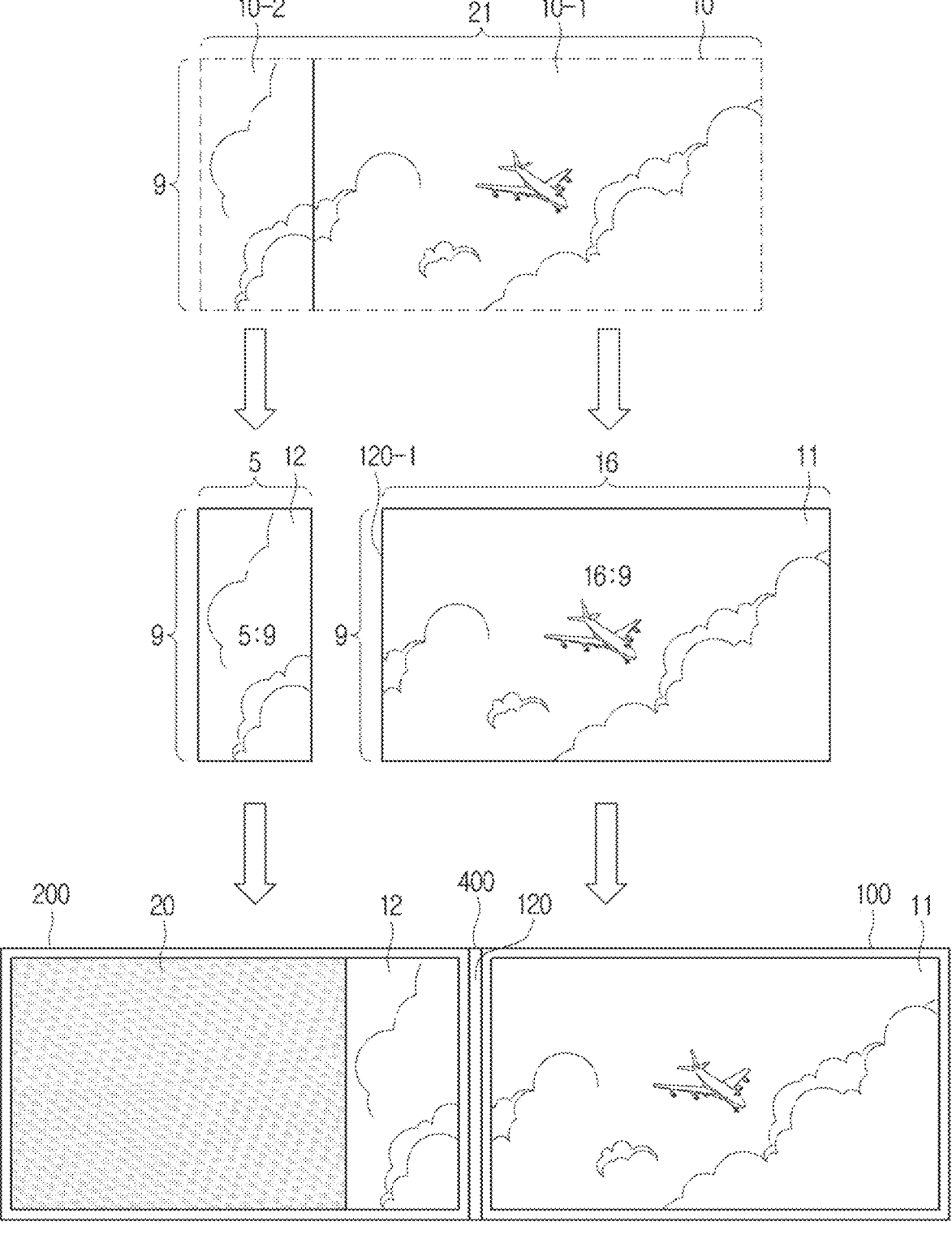
FIG. 4 is an example diagram illustrating a display apparatus and an external display apparatus dividing and displaying a content image according to an embodiment.

FIG. 3 is a flowchart illustrating schematically a method for controlling the display apparatus 100 according to an embodiment. FIG. 4 is an example diagram illustrating the display apparatus 100 and an external display apparatus 200 dividing and displaying a content image 10 according to an embodiment.

According to an embodiment, the processor 130 may sense that the external display apparatus 200 is connected to the at least one connector 120 through the hinge device 400 (S310).

Specifically, the processor 130 may sense that the at least one connector 120 is connected with the hinge device 400. Then, the processor 130 may sense the external display apparatus being connected to the same hinge device 400 through the at least one connector 120. At this time, the hinge device 400 may be included with a plurality of connectors. The plurality of connectors provided in the hinge device 400 may be a same type as with the connector 120 included in the display apparatus 100 (and the external display apparatus 200).

Referring to FIG. 4, for example, the processor 130 may sense a first connector 120-1 which is disposed at the left surface of the display apparatus 100 being electrically connected with the connector 120 of the hinge device 400. Then, the processor 130 may sense a connector which is disposed at a right surface of an external display apparatus 200-1 being electrically connected to another connector of a hinge device 400-1. To this end, the plurality of connectors of the hinge device 400-1 may be electrically connected with one another. Accordingly, the processor 130 may be electrically connected with the external display apparatus 200-1 through the hinge device 400-1, and may transmit the content image 10 to the external display apparatus 200-1. At this time, the processor 130 may identify, based on a position of the connector 120-1 which is connected with the hinge device 400-1, a relative position for the display apparatus 100 of the external display apparatus 200-1. That is, the processor 130 in FIG. 4 may identify, based on sensing the external display apparatus 200-1 being electrically connected through the first connector 120-1 which is disposed at the left surface of the display apparatus 100, that the external display apparatus 200-1 has been disposed at the left surface of the display apparatus 100.

Further, the processor 130 may obtain a first content image 11 corresponding to one portion of the content image 10 and obtain a second content image 12 corresponding to a remaining portion of the content image 10 based on the resolution of the display apparatus 100 (S320).

Specifically, the processor 130 may obtain, based on the resolution of the display apparatus 100, the first content image 11 displayed in the display apparatus 100 by cropping a portion of the content image 10. Here, the resolution of the display apparatus 100 may refer to a number of pixels included in the display 110, and may correspond with a screen ratio of the display 110.

Then, the processor 130 may identify a size of the content image 10. Here, the size of the content image 10 may be a resolution or screen ratio of the content image 10. For example, the processor 130 may identify the size of the content image 10 according to a standard of the content image 10 (e.g., Video Graphics Array (VGA), National Television Standards Committee (NTSC), Advanced Television Systems Committee (ATSC)-SD, Phase Alternating Line (PAL)/SECAM, etc.). That is, the processor 130 may identify, based on the content image 10 being identified as a VGA, a resolution of content as 640×480, and a screen ratio of content as 4:3.

Then, the processor 130 may crop, based on the identified resolution of the display apparatus 100 and the size of the content image 10, the content image 10 to a size corresponding to the resolution of the display apparatus 100. In an example, referring to FIG. 4, if the resolution of the display apparatus 100 is 1920×1080, and the screen ratio of the content image 10 is 21:9, the processor 130 may crop the content image 10 to a size of a 16:9 ratio. Then, the processor 130 may identify a portion of the image 10-1 obtained by cropping the content image 10 to the 16:9 ratio size as the first content image 11 displayed in the display apparatus 100.

Then, the processor 130 may identify a remaining portion of the image 10-2 excluding the first content image 11 from the content image 10 as the second content image 12 displayed in the external display apparatus. Specifically, referring to FIG. 4, the processor 130 may identify the remaining portion of the image 10-2 of a 5:9 ratio size corresponding to the remaining portion excluding the first content image 11 which is cropped to the 16:9 ratio size from the 21:9 ratio content image 10 as the second content image 12.

At this time, the processor 130 may crop the content image 10 based on a relative position of the external display apparatus 200 with respect to the display apparatus 100. Specifically, the processor 130 may determine an area to crop within the content image 10 based on the relative position of the external display apparatus 200. Accordingly, the first and second content images 11 and 12 may be different portions of the same content image 10, and may be determined according to the relative position of the external display apparatus 200.

Figure 5A:
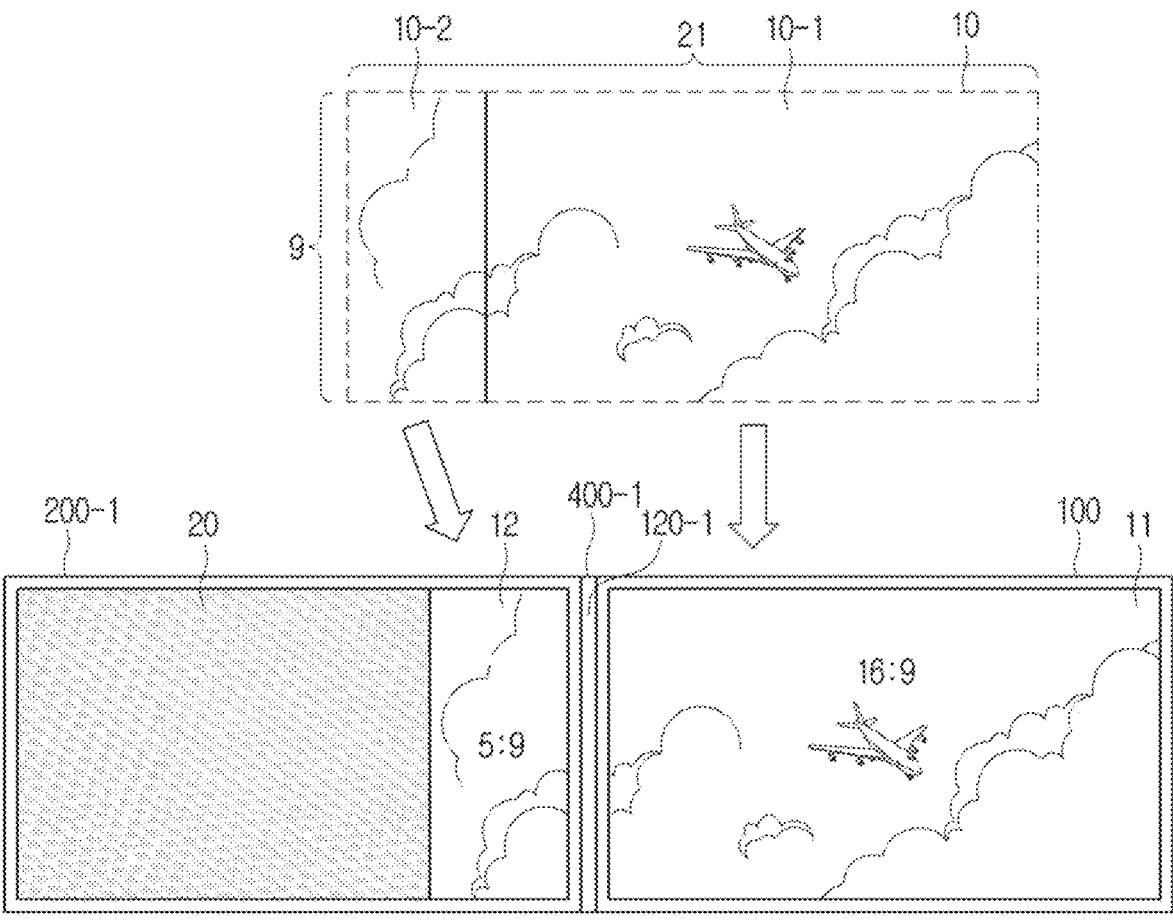
FIG. 5A, 5B and FIG. 5C are example diagrams illustrating dividing of a content image based on positions and a number of external display apparatuses with respect to a display apparatus according to an embodiment.
Figure 5B:
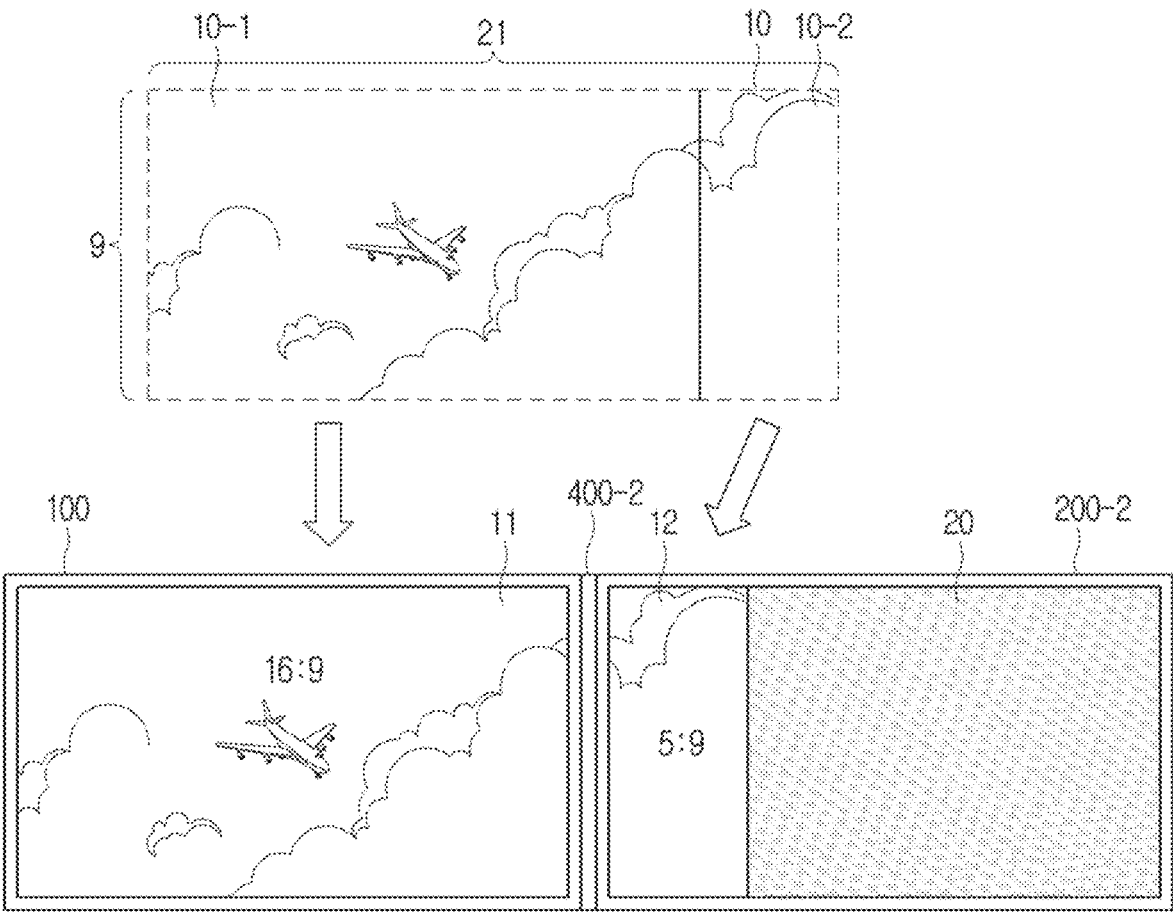
Figure 5C:
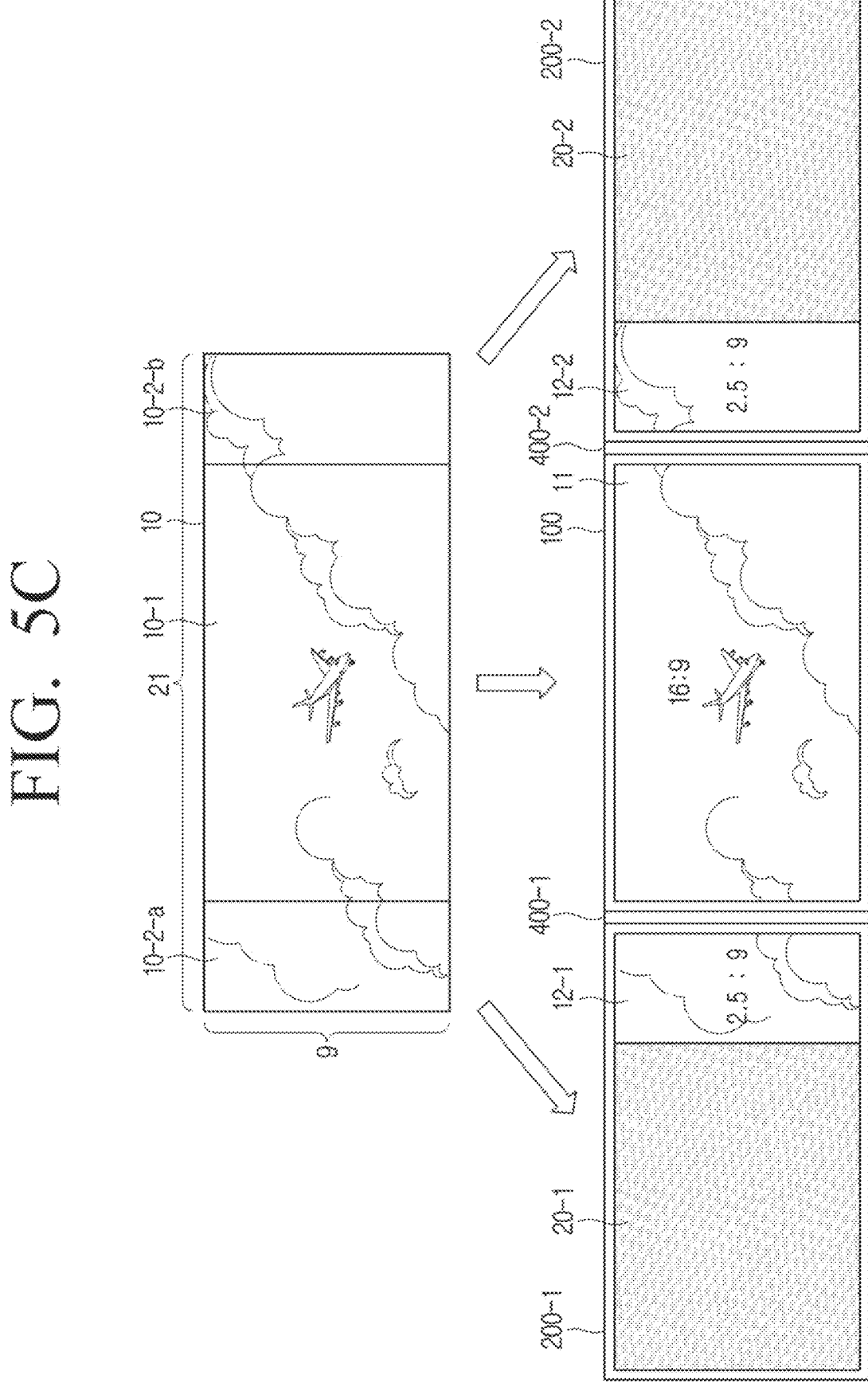

FIG. 5A to FIG. 5C are example diagrams illustrating a dividing of the content image 10 based on positions and a number of external display apparatuses 200 with respect to the display apparatus 100 according to an embodiment.

In an example, the processor 130 may identify one area positioned at an opposite direction from a direction corresponding to a position of the external display apparatus 200 within the content image 10, and obtain the first content image 11 corresponding to one portion of the content image 10 by cropping the identified one area to a size corresponding to the resolution of the display apparatus 100.

Specifically, if the display apparatus 100 includes the plurality of connectors 120 (a first connector 120-1 and a second connector 120-2) at the left surface and the right surface thereof, respectively, the display apparatus 100 may identify the relative position of the external display apparatus with respect to the display apparatus 100 based on the position of the connector 120 sensed as connected with the external display apparatus from among the plurality of connectors 120. The first and second connectors 120-1 and 120-2 may be respectively connected with separate hinge devices (first and second hinge devices 400-1 and 400-2).

Referring to FIG. 5A, based on the external display apparatus 200-1 being electrically connected with the first connector 120-1 of the display apparatus 100, the display apparatus 100 may identify that the external display apparatus 200-1 has been disposed at the left side of the display apparatus 100. Accordingly, the processor 130 may crop the content image 10 from the right side opposite to the left side to a size corresponding to the resolution of the display apparatus 100, and obtain the first content image 11. Then, the processor 130 may obtain the remaining image of the content image 10, that is, a left side portion image 10-2 of the content image 10 (the left side portion image of the 5:9 ratio size) as the second content image 12.

Referring to FIG. 5B, based on an external display apparatus 200-2 being electrically connected with the second connector 120-2 of the display apparatus 100, the display apparatus 100 may identify that the external display apparatus 200-2 has been disposed at the right side of the display apparatus 100. Accordingly, the processor 130 may crop the content image 10 from the left side opposite to the right side to a size corresponding to the resolution of the display apparatus 100, and obtain the first content image 11. Then, the processor 130 may obtain the remaining image of the content image 10, that is, a right side portion image 10-2 of the content image 10 (the right side portion image of the 5:9 ratio size) as the second content image 12.

The processor 130 may crop the content image 10 based on a number of external display apparatuses 200 which is connected with the display apparatus 100. Specifically, the processor 130 may determine an area to crop within the content image 10 based on the number of external display apparatuses 200 connected with the display apparatus 100.

In an example, the processor 130 may obtain the first content image 11 by cropping the content image 10 based on the number of external display apparatuses 200 and the resolution of the display apparatus 100 connected through at least one from among the first and second connectors 120-1 and 120-2.

Referring to FIG. 5C, the processor 130 may determine, based on the external display apparatuses 200-1 and 200-2 being sensed as connected to the first and second connectors 120-1 and 120-2, respectively, an area to crop within the content image 10. For example, the area to crop within the content image 10 may be a center area of the content image 10. That is, the processor 130 may determine an area to crop to obtain the first content image 11 within the content image 10 differently according to the number of external display apparatuses 200 connected with the display apparatus 100. Specifically, the processor 1430 may determine an area to crop within the content image 10 by also taking into consideration the positions of the plurality of external display apparatuses 200 connected with the display apparatus 100.

That is, referring to FIG. 5C, the processor 130 may identify that a number of the external display apparatuses 200-1 and 200-2 connected with the display apparatus 100 is two, and that the external display apparatuses 200-1 and 200-2 are respectively connected to the left side and the right side of the display apparatus 100. Accordingly, the processor 130 may obtain the first content image 11 by cropping the center area of the content image 10 to a size corresponding with the resolution of the display apparatus 100. Then, the processor 130 may obtain a left side portion image 10-2-*a* of a 2.5:9 ratio size and a right side portion image 10-2-*b* of a 2.5:9 ratio size, respectively, as the second content images 12 of the respective external display apparatuses.

The processor 130 may display the obtained first content image 11 through the display 110 (S330), and transmit the second content image 12 to the external display apparatus 200 through the connector 120 for the second content image 12 corresponding to the remaining portion of the content image 10 to be displayed (S340).

The processor 130 may control the display 110 to display the first content image 11. The processor 130 may transmit the second content image 12 to the external display apparatus 200 through the connector 120. Specifically, the second content image 12 may be transferred to the external display apparatus through a connector of the hinge device 400 connected with the connector 120 of the display apparatus 100 and a connector of the external display apparatus connected with another connector of the hinge device 400.

Thereby, the content image 10 may be displayed in the display apparatus 100 and the external display apparatus 200. Specifically, referring to FIG. 4, the first content image 11 which is a portion of the image of the content image 10 may be displayed in the display apparatus 100, and the second content image 12 which is another portion of the image of the content image 10 may be displayed in the external display apparatus 200-1 positioned at the left side of the display apparatus. Accordingly, the user may view the whole content image 10 through the display apparatus 100 and the external display apparatus 200-1.

Referring to FIG. 4, if the external display apparatus 200-1 has the same resolution as the display apparatus 100, a gap area (or a blank area) 20 in which the content image 10 (i.e., the second content image 12) is not displayed may be included in the external display apparatus 200-1. Specifically, because the second content image 12 which is displayed in the external display apparatus 200-1 is the remaining image excluding the first content image 11 obtained by being cropped based on the resolution of the display apparatus 100 (specifically, the resolution of the display apparatus 100 having the same resolution as the external display apparatus 200-1) from among the content image 10, a size of the second content image 12 may not clearly match with the external display apparatus 200. Accordingly, the gap area 20 in which the second content image 12 is not displayed may be displayed in the display 110 of the external display apparatus 200-1. Specifically, the gap area 20 may be displayed as a black colored image. However, embodiments are not limited thereto, and the gap area 20 may be displayed with a separate content image 10 by the external display apparatus 200-1.

The gap area 20 displayed in the display 110 of the external display apparatus 200-1 may be displayed in the external display apparatus 200-1 by the processor 130 of the display apparatus 100 combining the obtained second content image 12 with the black colored image and providing to the external display apparatus 200-1. Alternatively, the processor 130 of the external display apparatus 200-1 that received the second content image 12 from the processor 130 of the display apparatus 100 may identify the size of the second content image 12 and a size of the gap area 20 based on the resolution of the external display apparatus 200-1, and after generating the black colored image corresponding to the gap area 20, display the same together with the second content image 12. However, the above is not limited thereto, and an image corresponding to the gap area 20 may be substituted with images of various forms.

The processor 130 may sense the movement of the external display apparatus 200 relative to the hinge device 400 while displaying the first content image 11 (S350).

Specifically, the processor 130 may sense the external display apparatus 200 being folded toward the display apparatus 100. Specifically, the processor 130 may sense, based on the external display apparatus 200 being sensed as moving toward the front relative to the hinge device 400 (i.e., rotating, relative to the hinge device 400, in a direction in which an angle formed by the display apparatus 100 and the external display apparatus 200 decreases from 180°) while the display apparatus 100 and the external display apparatus 200 are disposed side by side toward the front (i.e., in a state in which an angle shaped by the display apparatus 100 and the external display apparatus 200 is 180° relative to the hinge device 400), the external display apparatus 200 as being folded.

The processor 130 may determine, based on the display apparatus 100 sensing that the external display apparatus 200 is being folded while displaying the first content image 11, a size of the second content image 12 to be displayed in the external display apparatus 200.

Then, the processor 130 may adjust the size of the second content image 12 based on an angle at which the external display apparatus 200 moved while maintaining the size of the first content image 11 (S360).

Specifically, attributes within the content image 10 which the user may perceive according to a viewing angle may vary. For example, if the viewing angle is between 5° and 10°, the user may perceive and identify texts within the content image 10. In addition, if the viewing angle is between 5° and 30°, the user may perceive and identify shapes within the content image 10. In addition, if the viewing angle is between 30° and 60°, the user may perceive and identify colors within the content image 10. If the viewing angle is between 62° and 94°, the user may perceive and identify motions of objects within the content image 10. In the case of a modular display apparatus 100 coupled with a plurality of display apparatuses 100, an angle formed by the plurality of display apparatuses 100 may be related to the viewing angle of the user. That is, as the angle formed by the plurality of display apparatuses 100 increases, the viewing angle of the user also increases, and as the angle formed by the plurality of display apparatuses 100 decreases, the viewing angle of the user also decreases. Therefore, the processor 130 may sense a difference in angle between the display apparatus 100 and the external display apparatus 200 connected with the display apparatus 100, and adjust the size of the content image 10 displayed in the external display apparatus 200 for the attributes perceivable by the user from the viewing angle of the user corresponding to the changed angle to be more clearly perceived within the content image 10. That is, if the movement of the external display apparatus 200 is sensed relative to the hinge device 400 while displaying the first content image 11, the processor 130 may identify the angle formed by the display apparatus 100 and the external display apparatus 200 based on the angle at which the external display apparatus 200 moved (angle rotated by the external display apparatus 200), and adjust the size of the second content image 12 displayed in the external display apparatus 200 based on the viewing angle of the user corresponding to the identified angle (i.e., angle formed by the display apparatus 100 and the external display apparatus 200).

Specifically, while displaying the first content image 11, the processor 130 may identify that the viewing angle of the user for the second content image 12 in the external display apparatus 200 has reduced while maintaining the viewing angle of the user for the first content image 11 in the display apparatus 100 as the external display apparatus 200 is moved relative to the display apparatus 100 and the hinge device 400. Accordingly, the processor 130 may adjust only the size of the second content image 12 displayed in the external display apparatus 200, and maintain the size of the first content image 11 displayed in the display apparatus 100. Because the display apparatus 100 maintains a fixed state, the viewing angle of the user for the display apparatus 100 is maintained.

At this time, the size of the second content image 12 may be adjusted according to a range of angle formed by the display apparatus 100 and the external display device 200 corresponding to a range of viewing angle corresponding to attributes perceivable within the content image 10 described above.

According to an embodiment, the processor 130 may adjust the size of the second content image 12 in inverse proportion to the angle formed by the external display apparatus 200 and the display apparatus 100 relative to the hinge device 400. Specifically, the processor 130 may further increase the size of the second content image 12 as a folding degree of the external display apparatus 200 is greater (i.e., as rotation angle of the external display apparatus 200 is greater). That is, the processor 130 may adjust the size of the second content image 12 in proportion to a movement angle (i.e., rotation angle) of the external display apparatus 200.

Figure 6A:
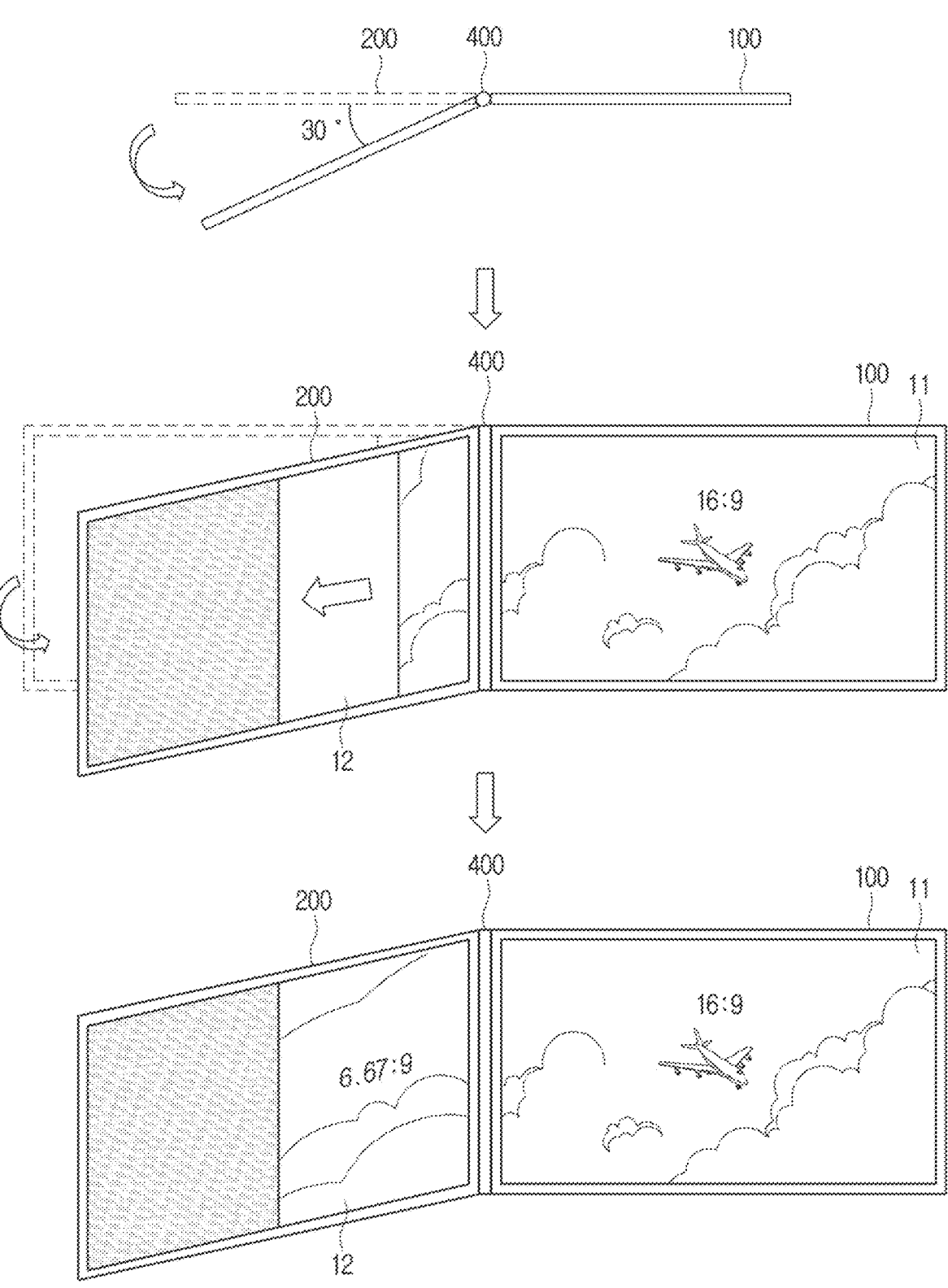
FIG. 6A and FIG. 6B are example diagrams illustrating an adjustment in size of a second content image according to a rotation angle of an external display apparatus according to an embodiment.
Figure 6B:
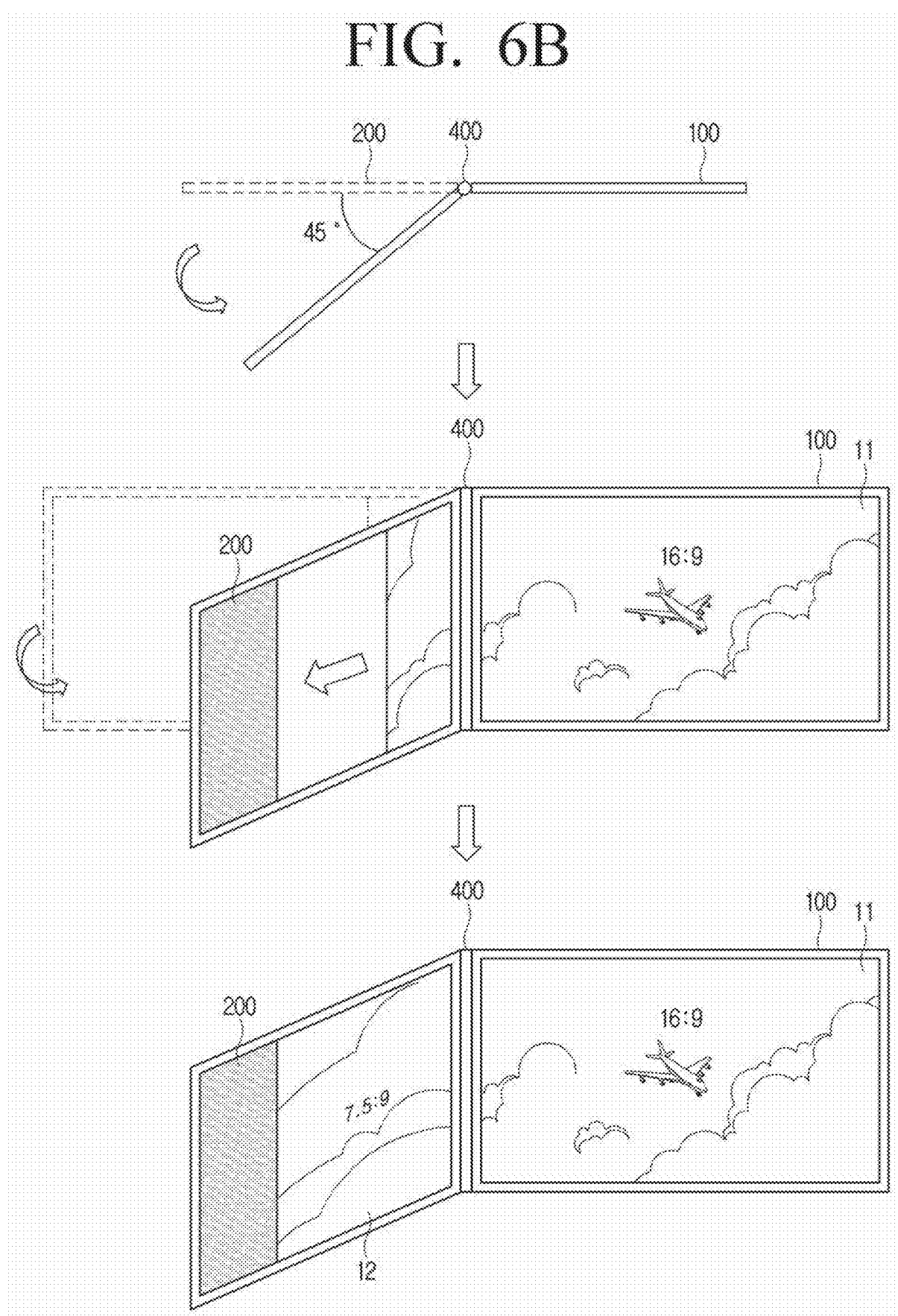

FIG. 6A and FIG. 6B are example diagrams illustrating an adjustment in size of the second content image 12 according to a rotation angle of the external display apparatus 200 according to an embodiment.

Specifically, referring to FIG. 6A, the processor 130 may increase a size of a width of the second content image 12 in the external display apparatus 200 when the external display apparatus 200 has rotated 450 relative to the hinge device 400 more than when the external display apparatus 200 has rotated 300 relative to the hinge device 400. At this time, the processor 130 may maintain the size of the first content image 11 displayed in the display apparatus 100 as is regardless of the rotation angle of the external display apparatus 200.

The processor 130 may increase the size of the second content image 12 by increasing the width of the second content image 12. Accordingly, by displaying the second content image 12, the gap area 20 displayed in the display 110 of the external display apparatus 200 may decrease as the size of the second content image 12 increases.

The processor 130 according to an embodiment may adjust, based on Equation 1 below, the width of the second content image 12 displayed in the external display apparatus 200.

$$\text{Width of second content image} = \frac{(X1 - X2)}{n} \times \left(1 + \frac{\alpha}{\text{min}}\right) \quad \text{(Equation 1)}$$

Here, X1 may be a horizontal pixel value of a resolution of the content image 10 (or a horizontal ratio of the content image 10), X2 may be a horizontal pixel value of the resolution of the first content image 11 (or a horizontal ratio of the resolution of the first content image 11), n may be a number of external display apparatuses 200 connected with the display apparatus 100, α may be the rotation angle of the external display apparatus 200 relative to the hinge device 400, and min may be a minimum angle that can be formed by the external display apparatus 200 and the display apparatus 100 relative to the hinge device 400.

Specifically, referring to FIG. 6A, if the external display apparatus 200 is rotated 300 relative to the hinge device 400, the screen ratio of the content image 10 is 21:9, a resolution ratio of the display apparatus 100 is 16:9 (i.e., if the resolution is 1920×1080), and a minimum angle that can be formed by the external display apparatus 200 and the display apparatus 100 is 90°, the processor 130 may adjust a horizontal ratio of the second content image 12 (i.e., ratio corresponding to width) to 6.67, based on (((21−16)/1×(1+ 30°/90°)). That is, the processor 130 may adjust the second content image 12 of a 5:9 ratio size being displayed in the external display apparatus 200 to a 6.67:9 ratio size.

Alternatively, referring to FIG. 6B, if the external display apparatus 200 is rotated 450 relative to the hinge device 400, the screen ratio of the content image 10 is 21:9, the resolution ratio of the display apparatus 100 is 16:9 (i.e., if the resolution is 1920×1080), and the minimum angle that can be formed by the external display apparatus 200 and the display apparatus 100 is 90°, the processor 130 may adjust the horizontal ratio of the second content image 12 (i.e., ratio corresponding to width) to 7.5, based on (((21-16)/1×(1+ 45°/90°)). That is, the processor 130 may adjust the second content image 12 of the 5:9 ratio size being displayed in the external display apparatus 200 to a 7.5:9 ratio size.

That is, processor 130 may adjust the size of the second content image 12 in proportion to the movement angle (i.e., rotation angle) of the external display apparatus 200.

Figure 7:
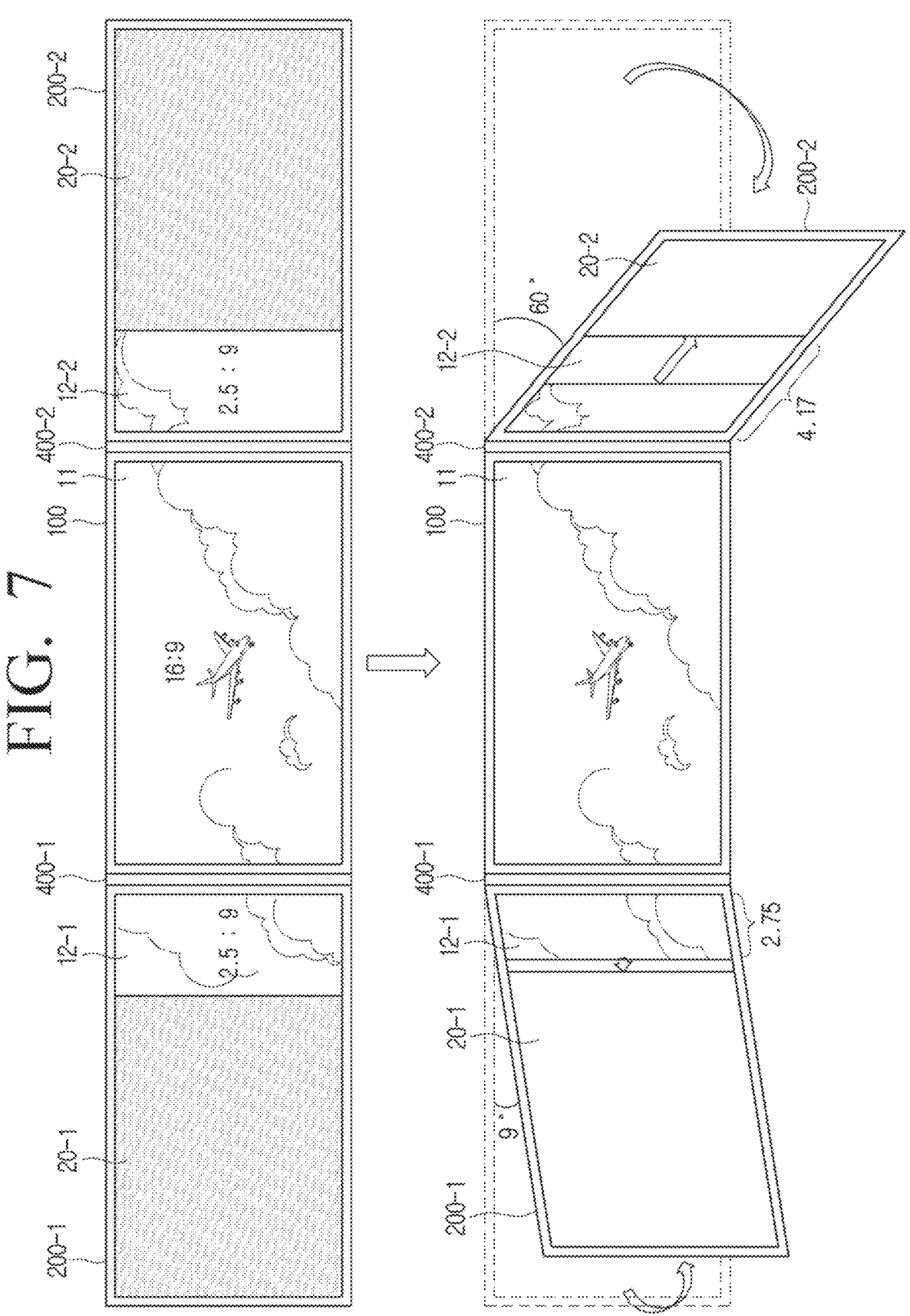
FIG. 7 is an example diagram illustrating adjustments in size of a second content image according to rotation angles of a plurality of external display apparatuses, respectively, according to an embodiment.

FIG. 7 is an example diagram illustrating adjustments in size of the second content image 12 according to rotation angles of the plurality of external display apparatuses 200, respectively, according to an embodiment.

The processor 130 may adjust, based on the display apparatus 100 being connected with a plurality of external display apparatuses 200-1 and 200-2, the size of the second content image 12 displayed in the respective external display apparatuses 200-1 and 200-2 based on an angle at which the respective external display apparatuses 200-1 and 200-2 moved when the respective external display apparatuses 200-1 and 200-2 are sensed as having moved relative to the respective hinge devices 400 while displaying the first content image 11 through the display 110.

Referring to FIG. 7, the processor 130 may sense the movement of the external display apparatuses 200-1 and 200-2 which respectively display the left side portion image of a 2.5:9 ratio size and the right side portion image of a 2.5:9 ratio size while the first content 11 of the 16:9 ratio size is being displayed through the display 110. For example, if the external display apparatus connected to the left side of the display apparatus 100 through the first hinge device 400 (hereinafter, a first external display apparatus 200-1) is sensed as having rotated 9° relative to a first hinge device 400-1, and the external display apparatus connected to the right side of the display apparatus 100 through the second hinge device 400 (hereinafter, a second external display apparatus 200-2) is sensed as having rotated 60° relative to a second hinge device 400-2, the processor 130 may adjust the size of the second content image 12 being displayed in the respective external display apparatuses 200-1 and 200-2 based on angles at which the respective external display apparatuses 200-1 and 200-2 rotated. Specifically, if the screen ratio of the content image 10 is 21:9, the resolution ratio of the display apparatus 100 is 16:9 (i.e., if the resolution is 1920×1080), and the minimum angle that can be formed by each of the external display apparatus 200 and the display apparatus 100 is 90°, the processor 130 may adjust the horizontal ratio of the second content image 12 (i.e., ratio corresponding to width) being displayed in the first external display apparatus 200-1 to 2.75(((21-16)/2× (1+9°/90°)). Alternatively, the horizontal ratio of the second content image 12 (i.e., ratio corresponding to width) being displayed in the second external display apparatus 200-2 may be adjusted to 4.17(((21-16)/2×(1+60°/90°)). That is, the processor 130 may adjust the second content image 12 of the 2.5:9 ratio size being displayed in the first external display apparatus 200-1 to the 2.75:9 ratio size, and adjust the second content image 12 of the 2.5:9 ratio size being displayed in the second external display apparatus 200-2 to the 4.17:9 ratio size. At this time, the processor 130 may maintain the size of the first content image 11 being displayed in the display apparatus 100 as is. Then, the processor 130 may transmit the second content image 12 adjusted respectively in size to the first and second external display apparatuses through the connectors (i.e., first and second connectors) connected respectively with the external display apparatuses.

The processor 130 may not adjust the size of the second content image 12 for the external display apparatus that did not move from among the plurality of external display apparatuses (first and second external display apparatuses 200-1 and 200-2).

The processor 130 according to an embodiment may identify a ratio of the content image 10 based on a movement of the external display apparatus 200 being sensed relative to the hinge device 400 and maintain without adjusting the size of the second content image 12 based on the identified ratio being identified as a preset ratio while displaying the first content image 11.

Specifically, the processor 130 may not adjust the size of the second content image 12 if the ratio of the content image 10 is identified as matching with the preset ratio even if the movement of the external display apparatus 200 is sensed relative to the hinge device 400 while displaying the first content 11. Here, the ratio of the content image 10 may be a size ratio of the content image 10.

Specifically, the processor 130 may maintain, based on a ratio of the whole content image 10 being identified in proportion with a value that summed the resolutions of the display apparatus 100 and the external display apparatus 200 connected with the display apparatus 100, the size of the second content image 12 without adjustment. That is, the processor 130 may not adjust the size of the second content image 12 even if the movement of the external display apparatus 200 is sensed if the size of the second content image 12 is identified as no longer increasable based on the resolution of the display 110 of the external display apparatus 200.

According to an embodiment, the processor 130 may transmit the size adjusted second content image 12 to the external display apparatus 200 through the connector 120 for the size adjusted second content image 12 to be displayed (S370).

That is, the processor 130 may transmit the size adjusted second content image 12 to the external display apparatus 200 through the connector 120 for the external display apparatus 200 to display the second content image 12 which is sized adjusted from the existing second content image 12. Accordingly, the size adjusted second content image 12 may be displayed in the external display apparatus 200 which moved relative to the hinge device 400, and the user may more clearly perceive the attributes within the second content image 12 from within the changed viewing angle.

The processor 130 may identify the movement angle (i.e., rotation angle) of the external display apparatus 200 in real-time in a process of the external display apparatus 200 moving about the hinge device 400, and transmit to the external display apparatus 200 through the connector 120 by gradually adjusting the size of the second content image 12 according to the identified movement angle. Accordingly, in the process of the external display apparatus 200 moving, the user may view the second content image 12 gradually increasing in size through the external display apparatus 200, and through the above, the display apparatus 100 may minimize an obstruction to the viewing angle of the user due to the folding of the external display apparatus 200.

The processor 130 may sense, based on the external display apparatus 200 being sensed as connected to the at least one connector 120 through the hinge device 400, the angle formed by the external display apparatus 200 and the display apparatus 100 relative to the hinge device 400. That is, the processor 130 may identify, while the display apparatus 100 and the external display apparatus 200 are in an initially connected state, the angle formed by the external display apparatus and the display apparatus 100 relative to the hinge device 400.

At this time, the processor 130 may adjust, based on it being identified that the sensed angle is not a preset angle, the size of the second content image 12 corresponding to the remaining portion of the content image 10 based on the sensed angle.

Specifically, the preset angle may be 180° formed by the external display apparatus 200 and the display apparatus 100 when the external display apparatus 200 and the display apparatus 100 are disposed in parallel so as to face the front. At this time, the processor 130 may adjust, based on it being identified that the angle formed by the external display apparatus 200 and the display apparatus 100 is not 180° at a time-point the external display apparatus 200 is sensed as connected to the display apparatus 100, the size of the second content image 12 based on the angle formed by the external display apparatus 200 and the display apparatus 100. That is, the processor 130 may adjust the obtained size of the second content image 12 (i.e., the remaining image excluding the first content image 11 obtained based on the resolution of the display apparatus 100 from among the content image 10) based on the angle formed by the external display apparatus 200 and the display apparatus 100 at the time-point the external display apparatus 200 is sensed as connected to the display apparatus 100. Because a method of adjusting the size of the second content image 12 can be applied to the above-described embodiment identically, detailed descriptions thereof will be omitted.

At this time, the processor 130 may sense a resistance value of a resistor, which is installed at the hinge device 400 and bends in the moving direction of the external apparatus 200 as the hinge device 400 is rotated, and identify the angle formed by the external display apparatus 200 and the display apparatus 100 based on the sensed resistance value.

Specifically, the hinge device 400 may include a resistor that bends in the rotating direction as the external display apparatus 200 connected to the hinge device 400, and a sensor that senses a resistance of the resistor. At this time, the sensor may sense a resistance value of a resistor to bending as the resistor is bent in a direction the external display apparatus 200 is rotated according to the external display apparatus 200 rotating relative to the hinge device 400. Then, the processor 130 may identify the angle formed by the external display apparatus 200 and the display apparatus 100 based on the resistance value sensed by the sensor. That is, the processor 130 may identify the angle formed by the external display apparatus 200 and the display apparatus 100 which corresponds to the resistance value of the resistor to bending. To this end, in the memory of the display apparatus 100, a matching table of resistance values of the resistor to bending and angles formed by the external display apparatus 200 and the display apparatus 100 may be stored.

The processor 130 may transmit the size adjusted second content image 12 to the external display apparatus 200 through the connector 120 for the size adjusted second content image 12 to be displayed. Accordingly, the processor 130 may provide the content image 10 appropriate to the viewing angle of the user corresponding to the angle formed by the display apparatus 100 and the external display apparatus 200 even when the display apparatus 100 and the external display apparatus 200 are in the initially connected (or coupled) state.

According to an embodiment, the processor 130 may be installed in the external display apparatus 200 and may sense a rotation of a wheel rotating according to the movement of the external display apparatus 200, and identify the angle at which the external display apparatus 200 is moved based on the sensed number of wheel rotations.

Figure 8:
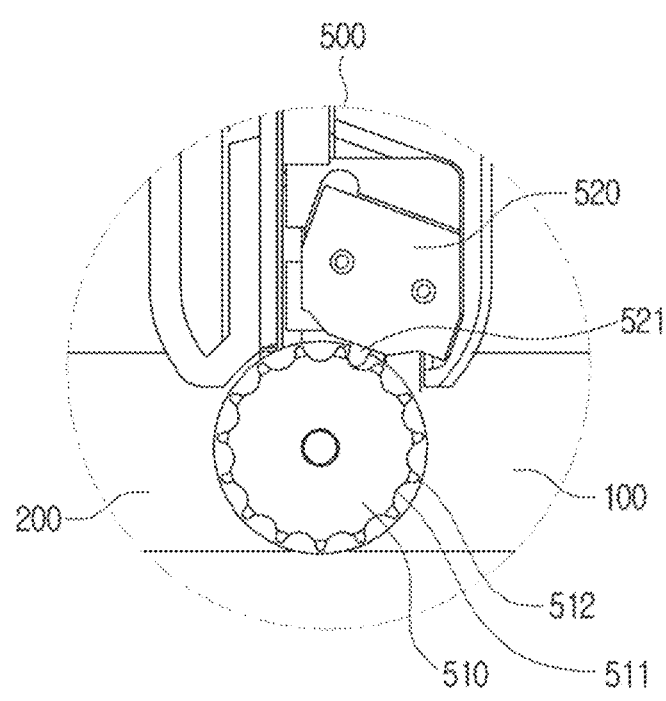
FIG. 8 is a diagram illustrating a wheel device provided in an external display apparatus according to an embodiment.

FIG. 8 is a diagram illustrating a wheel device provided in the external display apparatus 200 according to an embodiment.

Referring to FIG. 8, a wheel device 500 may include a wheel 510 and a locker 520. The wheel device 500 may be positioned at a lower end of the external display apparatuses 200-1 and 200-2, and the wheel device 500 allows movement of the external display apparatuses 200-1 and 200-2.

The wheel 510 may be formed of several locking grooves 511 and several protrusions 512. If external force is exerted at the wheel 510, the wheel 510 may be turned in a clockwise direction or an anti-clockwise direction. Through the operation of the wheel as described above, the external display apparatus may rotate as in FIG. 8.

At this time, if external force is not exerted at the wheel 510 so as to maintain the folding degree and not change the folding angle of the external display apparatus, the locker 520 of the wheel device 500 may lock the wheel 510 such that the wheel 510 is not able to rotate any further. The rotation of the wheel 510 may be prevented as a latch 521 of the locker 520 is inserted in the locking grooves 511 present between a plurality of protrusions 512 of the wheel 510. However, the latch 521 of the locker 520 may not be inserted in the locking grooves 511 by being pushed by the plurality of protrusions 512 by the rotation of the wheel 510 when external force is exerted at the wheel 510, and the wheel 510 may continue to rotate according to a direction of the external force.

In the wheel device 500, a sensor that senses the rotation of the wheel 510 may be included. For example, a turning on or turning off of a switch may be sensed due to the protrusion 512 contacting the latch 521 according to the rotation of the wheel 510 by attaching the switch to a portion of the protrusion 512 of the wheel 510, and the wheel 510 rotating to which direction by how many clicks may be sensed by sensing a number of times of being turned-on or turned-off and the direction of rotation.

The sensing of rotation through the switch is merely one example, and the rotation of the wheel 510 may be sensed by various sensors such as, for example, and without limitation, the acceleration sensor, the magnetic sensor, the optical sensor, and the like.

Information on the rotation of the wheel 510 sensed in the wheel device 500 may be provided as electric signals to the processor 130 of the display apparatus 100. For example, the processor 130 may receive information on the rotation of the wheel 510 from the external display apparatus. Through the above, the processor 130 may obtain information on the rotation angle of the wheel 510, and identify an angle at which the external display apparatus 200 moved according to the rotation angle.

The processor 130 may identify the movement angle of the external display apparatus 200 based on the resistance value of the resistor, which is installed at the hinge device 400 and being bent in the moving direction of the external display apparatus 200 as the hinge device 400 is rotated. Specifically, the processor 130 may identify, based on the display apparatus 100 and the external display apparatus 200 being sensed as connected through the connector 120, the resistance value of the resistor installed at the hinge device 400 with an initial resistance value. Then, the processor 130 may identify, based on the resistance value of the resistor installed at the hinge device 400 being identified as changed based on the initial resistance value, the angle at which the external display apparatus 200 rotated based on the identified resistance value. The resistance value of the resistor may be obtained from the sensor provided in the hinge device 400. In this regard, because the above-described embodiment can be identically applied, detailed descriptions thereof will be omitted.

Figure 9:
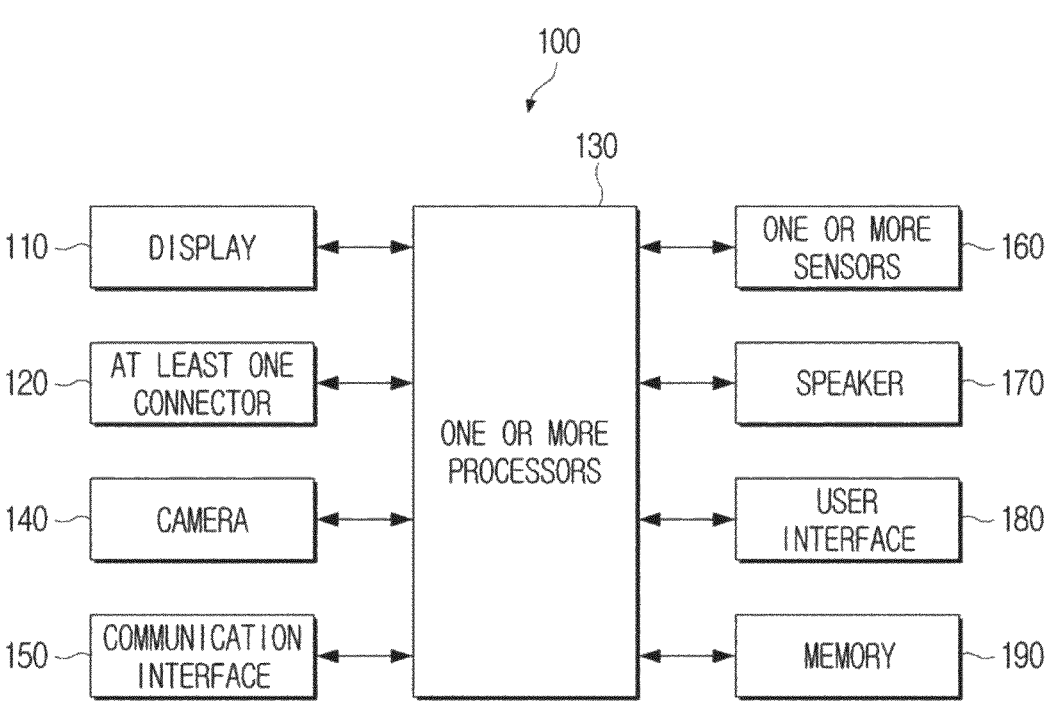
FIG. 9 is a configuration diagram illustrating in detail a display apparatus according to an embodiment.

FIG. 9 is a configuration diagram illustrating in detail a display apparatus according to an embodiment. For configurations that overlap with the configurations shown in FIG. 2 from among the configurations shown in FIG. 9, detailed descriptions will be omitted.

The display apparatus 100 may include the display 110, the at least one connector 120, a camera 140, a communication interface 150, one or more sensors 160, a speaker 170, a user interface 180, a memory 190, and at least one processor 130.

The camera 140 may obtain an image associated with an object by capturing light reflected from or emitted by the object in the surrounding of the display apparatus 100. Specifically, the camera 140 may obtain a plurality of images associated with the user positioned in the surrounding of the display apparatus 100. To this end, the camera 140 may be implemented as a capturing device such as, for example, and without limitation a capturing device having a complementary metal oxide semiconductor (CMOS) Image Sensor (CIS) structure, a capturing device having a Charge Coupled Device (CCD) structure, and the like. However, the camera is not limited thereto, and the camera 140 may be implemented as a camera module of various resolutions that can capture a subject.

The camera 140 may be implemented as a depth camera (e.g., an infrared (IR) depth camera, etc.), a stereo camera, a red, green and blue (RGB) camera, or the like. Thereby, the image obtained through the camera 140 may be further included with depth information associated with the subject (e.g., user).

The communication interface 150 may transmit or receive content of various types. In an example, the processor 130 may receive a content image through the communication interface 150. Alternatively, the processor 130 may transmit the second content image to the external display apparatus through the communication interface 150.

The communication interface 150 may receive or transmit signals in a streaming or download method from an external apparatus (e.g., a user terminal), an external storage medium (e.g., a universal serial bus (USB) memory), an external server (e.g., WEBHARD), and the like through communication methods such as, for example, and without limitation, an AP-based Wi-Fi (a wireless LAN network), Bluetooth, ZigBee, a wired/wireless local area network (LAN), a wide area network (WAN), Ethernet, IEEE 1394, HDMI), USB, a mobile high-definition link (MHL), Audio Engineering Society/European Broadcasting Union (AES/EBU), optical, coaxial, and the like.

The display apparatus 100 may include at least one sensor 160. The at least one sensor 160 may include sensors (e.g., a LiDAR sensor, a ToF sensor, etc.) that sense objects in the surrounding of the display apparatus 100. Additionally, the at least one sensor 160 may further include at least one from among a gesture sensor, a gyro sensor, a barometric sensor, a magnetic sensor, an acceleration sensor, a grip sensor, a proximity sensor, a color sensor, (e.g., an RGB sensor), a biometric sensor, a temperature/humidity sensor, an illuminance sensor, or an ultra violet (UV) sensor.

The speaker 170 may output sound signals to the outside of the display apparatus 100. The speaker 170 may output sound signals to playback multimedia, recordings, notification sounds, voice messages, and the like. The display apparatus 100 may include an audio output device such as the speaker 170, and may include an output device such as an audio output terminal. Specifically, the speaker 170 may provide obtained information, processed information generated based on the obtained information, a response result or operation resolute for the user voice, and the like in voice form. In an example, the processor 130 may output, based on a health state of a user identified based on biometric signals being identified as in danger, a warning sound or a voice message through the speaker 170.

The user interface 180 may be a configuration used by the display apparatus 100 in performing an interaction with the user, and the processor 130 may receive input of various information such as control information of the display apparatus 100 through the user interface 180. Specifically, setting information (e.g., brightness setting value or color value) related to the display apparatus 100 may be received through the user interface 180. The user interface 180 may include at least one from among a touch sensor, a motion sensor, a button, a jog dial, a switch, and a microphone, but is not limited thereto.

The memory 190 may store data necessary for the various embodiments. In an example, in the memory 190, the image content displayed in the display apparatus 100 may be stored.

The memory 190 may be implemented in a form of a memory embedded in the display apparatus 100 according to a data storage use, or in a form of a memory attachable to and detachable from the display apparatus 100. For example, data for the driving of the display apparatus 100 may be stored in the memory embedded to the display apparatus 100, and data for an expansion function of the display apparatus 100 may be stored in the memory attachable to and detachable from the display apparatus 100.

The memory embedded in the display apparatus 100 may be implemented as at least one from among a volatile memory (e.g., a dynamic RAM (DRAM), a static RAM (SRAM), or a synchronous dynamic RAM (SDRAM)), or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash or a NOR flash), a hard disk drive (HDD) or a solid state drive (SSD)).

In addition, the memory attachable to and detachable from the display apparatus 100 may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

According to an example, the memory 190 may store information on a plurality of neural network (or, artificial intelligence) models. In an example, the memory 190 may store a neural network model trained to identify biometric signals of a user based on an obtained corrected image. That is, by inputting a plurality of corrected images to the neural network model, the processor 130 may obtain biometric signals associated with the user.

Here, the storing information on the neural network model may mean storing of various information associated with an operation of the neural network model, for example, information associated with at least one layer included in the neural network model, a parameter used in each layer, information on a bias or the like. However, the information on the neural network model may be stored in a memory inside the processor 130 according to a form of implementation of the processor 130. For example, if the processor 130 is implemented as a dedicated hardware, the information on the neural network model may be stored in the memory inside the processor 130.

The various embodiments may not only be applied to the display apparatus, but also to electronic apparatuses of all types that include the display function.

Various embodiments described above may be implemented in a recordable medium which is readable by a computer or an apparatus similar to the computer using software, hardware, or the combination of software and hardware. In some cases, embodiments described herein may be implemented by the processor itself. According to a software implementation, embodiments such as the procedures and functions described herein may be implemented with separate software modules. The respective software modules may perform one or more functions and operations described herein.

The computer instructions for performing processing operations in the display apparatus 100 according to the various embodiments described above may be stored in a non-transitory computer-readable medium. The computer instructions stored in this non-transitory computer-readable medium may cause a specific device to perform a processing operation in the display apparatus 100 according to the above-described various embodiments when executed by a processor of the specific device.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

While aspects of embodiments have been particularly shown and described, it will be understood that various changes in form and details may be made therein without departing from the spirit and scope of the following claims.

What is claimed is:

1. A display apparatus, comprising:
a display;
a first hinge device; and
at least one processor configured to:
obtain a content image,
obtain, based on a first external display apparatus being connected to the display apparatus through the first hinge device, a first content image corresponding to a portion of the content image and a second content image corresponding to a remaining portion of the content image, wherein the first content image is identified based on a resolution of the display apparatus;
control the display to display the first content image;
provide the second content image to the first external display apparatus;
based on an angle between the display apparatus and the first external display apparatus decreasing while displaying the first content image, increase a width of the second content image provided to the first external display apparatus according to the angle while maintaining a size of the first content image;
based on the angle between the display apparatus and the first external display apparatus increasing while displaying the first content image, decrease the width of the second content image provided to the first external display apparatus according to the angle while maintaining the size of the first content image; and
based on the angle between the display apparatus and the first external display apparatus changing, change a width of a gap area, wherein the second content image is provided between the gap area and the display apparatus.

2. The display apparatus of claim 1, wherein the at least one processor is further configured to identify a direction corresponding to a position of the first external display apparatus, identify an area of the content image positioned at an opposite direction from the direction, and obtain the first content image by cropping the area to a size corresponding to the resolution of the display apparatus.

3. The display apparatus of claim 1, wherein the first hinge device is provided at a first side of the display apparatus,
wherein the display apparatus further comprises a second hinge device provided at a second side of the display apparatus, and
wherein the at least one processor is further configured to obtain the first content image by cropping the content image based on a number of external display apparatuses connected to the display apparatus and the resolution of the display apparatus.

4. The display apparatus of claim 3, wherein the at least one processor is further configured to adjust the width of the second content image based on:

$$\text{width of second content image} = \frac{(X1 - X2)}{n} \times \left(1 + \frac{\alpha}{\min}\right)$$

wherein X1 is a horizontal ratio of the content image, X2 is a horizontal ratio of the resolution of the display apparatus, n is the number of external display apparatuses connected with the display apparatus, α is the angle between the display apparatus the first external display apparatus, and min is a minimum angle that the first external display apparatus and the display apparatus can form.

5. The display apparatus of claim 1, wherein the at least one processor is further configured to identify, based on the angle changing while displaying the first content image, a ratio of the content image, and maintain, based on the ratio being identified as a preset ratio, a size of the second content image.

6. The display apparatus of claim 1, further comprising a wheel configured to rotate as the first external display apparatus rotates, and wherein the at least one processor is further configured to identify the angle based on a number of wheel rotations.

7. The display apparatus of claim 1, wherein the at least one processor is further configured to:

sense a resistance value of a resistor provided in the first hinge device, and identify the angle based on the resistance value.

8. The display apparatus of claim 1, wherein the at least one processor is further configured to:

sense, based on the first external display apparatus being connected to the display apparatus through the first hinge device, the angle between the display apparatus and the first external display apparatus, and adjust, based on the angle not being a preset angle, the width of the second content image provided to the first external display apparatus based on the angle.

9. The display apparatus of claim 1, wherein the gap area is displayed as a black colored image.

10. A method for controlling a display apparatus, the method comprising:

obtaining a content image;

sensing a connection of a first external display apparatus to the display apparatus through a first hinge device;

obtaining a first content image corresponding to a portion of the content image and a second content image corresponding to a remaining portion of the content image, wherein the first content image is identified based on a resolution of the display apparatus;

displaying the first content image through a display of the display apparatus;

providing the second content image to the first external display apparatus to control the second content image to be displayed on the first external display apparatus;

sensing rotation of the first external display apparatus relative to the display apparatus while displaying the first content image;

based on an angle between the display apparatus and the first external display apparatus decreasing while displaying the first content image, increasing a width of the second content image provided to the first external display apparatus according to the angle while maintaining a size of the first content image;

based on the angle between the display apparatus and the first external display apparatus increasing while displaying the first content image, decreasing the width of the second content image provided to the first external display apparatus according to the angle while maintaining the size of the first content image; and based on the angle between the display apparatus and the first external display apparatus changing, changing a width of a gap area, wherein the second content image is provided between the gap area and the display apparatus.

11. The method of claim 10, wherein the obtaining comprises:

identifying a direction corresponding to a position of the first external display apparatus, identifying an area of the content image positioned at an opposite direction from the direction, and obtaining the first content image by cropping the area to a size corresponding to the resolution of the display apparatus.

12. The method of claim 10, further comprising sensing connection of a second external display apparatus to the display apparatus through a second hinge device, wherein the first hinge device is provided at a first side of the display apparatus and the second hinge device is provided at a second side of the display apparatus, and wherein the obtaining comprises obtaining the first content image by cropping the content image based on a number of external display apparatuses connected to the display apparatus and the resolution of the display apparatus.

13. The method of claim 12, wherein the adjusting comprises adjusting the width of the second content image based on:

$$\text{width of second content image} = \frac{(X1 - X2)}{n} \times \left(1 + \frac{\alpha}{\min}\right)$$

wherein X1 is a horizontal ratio of the content image, X2 is a horizontal ratio of the resolution of the display apparatus, n is the number of external display apparatuses connected with the display apparatus, $\alpha$ is the angle between the display apparatus and the first external display apparatus, and min is a minimum angle that the first external display apparatus and the display apparatus can form.

14. A non-transitory computer-readable medium storing computer instructions for a display apparatus to perform an operation when executed by a processor of the display apparatus, the operation comprising:

obtaining a content image;

sensing a connection of a first external display apparatus to the display apparatus through a first hinge device;

obtaining a first content image corresponding to a portion of the content image and a second content image corresponding to a remaining portion of the content image, wherein the first content image is identified based on a resolution of the display apparatus;

displaying the first content image through a display of the display apparatus;

providing the second content image to the first external display apparatus to control the second content image to be displayed on the first external display apparatus;

sensing rotation of the first external display apparatus relative to the display apparatus while displaying the first content image;

based on an angle between the display apparatus and the first external display apparatus decreasing while displaying the first content image, increasing a width of the second content image provided to the first external display apparatus according to the angle while maintaining a size of the first content image;

based on the angle between the display apparatus and the first external display apparatus increasing while displaying the first content image, decreasing the width of the second content image provided to the first external display apparatus according to the angle while maintaining the size of the first content image; and based on the angle between the display apparatus and the first external display apparatus changing, changing a width of a gap area, wherein the second content image is provided between the gap area and the display apparatus.

15. A display controller comprising:

an interface configured to connect with a display apparatus and a first external display apparatus;

at least one processor configured to:

obtain a content image;

obtain, based on the display apparatus being connected to the first external display apparatus through a first hinge device, a first content image corresponding to a portion of the content image and a second content image corresponding to a remaining portion of the content image, wherein the first content image is identified based on a resolution of the display apparatus;

provide the first content image to the display apparatus;

provide the second content image to the first external display apparatus;

based on an angle between the display apparatus and the first external display apparatus decreasing while displaying the first content image, increase a width of the second content image provided to the first external display apparatus according to the angle while maintaining a size of the first content image;

based on the angle between the display apparatus and the first external display apparatus increasing while displaying the first content image, decrease the width of the second content image provided to the first external display apparatus according to the angle while maintaining the size of the first content image; and based on the angle between the display apparatus and the first external display apparatus changing, change a width of a gap area, wherein the second content image is provided between the gap area and the display apparatus.

16. The display controller of claim 15, wherein the at least one processor is further configured to identify a direction corresponding to a position of the first external display apparatus, identify an area of the content image positioned at an opposite direction from the direction, and obtain the first content image by cropping the area to a size corresponding to the resolution of the display apparatus.

17. The display controller of claim 15, wherein the first hinge device is provided at a first side of the display apparatus, wherein the display apparatus further comprises a second hinge device provided at a second side of the display apparatus, and wherein the at least one processor is further configured to obtain the first content image by cropping the content image based on a number of external display apparatuses connected to the display apparatus and the resolution of the display apparatus.

18. The display controller of claim 15, wherein the at least one processor is further configured to identify, based on the angle changing while displaying the first content image, a ratio of the content image, and maintain, based on the ratio being identified as a preset ratio, a size of the second content image.

* * * * *